United States Patent
El-Haj

(10) Patent No.: US 7,451,455 B1
(45) Date of Patent: Nov. 11, 2008

(54) APPARATUS AND METHOD FOR AUTOMATICALLY MANIPULATING SOFTWARE PRODUCTS

(75) Inventor: Mohammad H. El-Haj, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 10/609,229

(22) Filed: Jun. 27, 2003

Related U.S. Application Data

(60) Provisional application No. 60/467,445, filed on May 2, 2003.

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 7/00 | (2006.01) |
| G06F 17/30 | (2006.01) |
| G06F 11/00 | (2006.01) |

(52) U.S. Cl. ............... 719/320; 717/124; 717/125; 717/134; 707/3; 714/25; 714/100

(58) Field of Classification Search ......... 717/124–125, 717/134–135; 714/46, 38, 25, 100; 703/3; 719/328, 318, 320, 330; 713/400
See application file for complete search history.

(56) References Cited

U.S. PATENT DOCUMENTS

| 5,640,537 | A  | * | 6/1997  | Jessen et al. ............... 703/23 |
| 5,896,495 | A  | * | 4/1999  | Stein et al. ................. 714/38 |
| 6,970,883 | B2 | * | 11/2005 | Ku et al. ................. 707/103 Y |
| 6,993,748 | B2 | * | 1/2006  | Schaefer .................... 717/124 |
| 7,055,137 | B2 | * | 5/2006  | Mathews .................... 717/125 |
| 7,165,240 | B2 | * | 1/2007  | Patterson ................... 717/116 |
| 2002/0091968 | A1 | * | 7/2002  | Moreaux et al. ............. 714/38 |
| 2002/0152095 | A1 | * | 10/2002 | Jordon ........................ 705/1 |
| 2003/0236775 | A1 | * | 12/2003 | Patterson ..................... 707/3 |
| 2004/0194065 | A1 | * | 9/2004  | McGrath et al. ........... 717/124 |

OTHER PUBLICATIONS

Ivory et al., "The State of the Art in Automating Usability Evaluation of User Interfaces," ACM Computing Surveys, vol. 33, No. 4, Dec. 2001, pp. 470-516.

Guisado, "Testing Win32 GUIs With Perl and C," Windows Developer Magazine, vol. 13, No. 2, Feb. 2002, pp. 14-18.

Klementiev, "Software Driving Software: Active Accessibility-Compliant Appls Give Programmers New Tools to Manipulate Software," MSDN Magazine, Apr. 2000, available at <http://msdn.microsoft.com/msdnmag/issues/0400/aaccess/default.aspx>, 19 pages.

* cited by examiner

*Primary Examiner*—Meng-Ai An
*Assistant Examiner*—Qing-Yuan Wu

(57) ABSTRACT

A manipulation tool (e.g., "the XABLE tool") provides a user interface (UI) automation library that allows a tool user to find existing UI objects and then perform a UI action on such UI objects. In one exemplary application, the manipulation tool can be used by script writers to automatically drive the UI of an application under test. A plurality of selectable search strategies are provided for searching for UI objects. Further, an event handling object is provided for monitoring the firing of UI objects.

15 Claims, 11 Drawing Sheets

APPARATUS AND METHOD FOR AUTOMATICALLY MANIPULATING SOFTWARE PRODUCTS

This application claims the benefit of Provisional Application No. 60/467,445, filed on May 2, 2003, which is incorporated herein by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to an apparatus and method for automatically manipulating a software product, and, in a more particular implementation, to an apparatus and method for automatically manipulating the user interface functionality provided by a software product.

BACKGROUND

A variety of automation tools exist today for driving the graphical user interfaces of software products. These automation tools automatically supply a series of user inputs that simulate the actions that a human user might take to accomplish a prescribed task when using the software product. One application of these automation tools is in the field of software testing. A software developer can design an automation tool to perform a series of operations involving the graphical user interface of a software product in order to determine whether the software product contains errors, or whether the software product meets predetermined usability requirements.

While a human user can interact with the graphical user interface in a simple and intuitive manner, the automated tools cannot "see" the graphical user interface and thus must expressly rely on program statements to simulate a user's interaction. Providing an adequate collection of program instructions to mimic the user's interaction is a challenging task. This difficulty is partly due to the fact that the program instructions must simulate a vast number of ways that a human user can interact with the graphical user interface. For instance, the graphical user interface presents a large number of user interface objects for the human user to select from, and the user can manipulate these graphical objects in many different ways. Further, different machines may respond to the user's commands in different ways that may be difficult to precisely predict. For instance, there is typically a time lag between a user's command to activate a user interface object and the actual activation (or "firing") of this user interface object. A testing script should therefore provide some mechanism for accounting for this time lag if it is to reliably simulate interaction between the human user and the user's computer.

Some testing programs and automation tools attempt to address the above complexity by providing various simplifying assumptions. This design approach has several shortcomings. For instance, programmers may resort to a generous use of simple timing mechanisms such as "sleeps" to handle synchronization issues. That is, a programmer my add a fixed delay period (i.e., a "sleep") after a command to launch a user interface object, where the delay period is selected to be large enough to account for the processing speeds of different machines. This strategy, however, may result in an inefficient test script because these sleeps will be unnecessarily long for many machines, and potentially too short in other unforeseen circumstances. Other attempts to simplify the testing program may resort to the use of a relatively rigid collection of program statements that programmers must adhere to in their scripts. This strict programming framework might be viewed unfavorably by programmers/testers or automation script authors, as it prevents these individuals from implementing different kinds of script writing strategies to suit their individual styles and preferences.

On the other hand, a tool that attempts to duplicate the full richness in interfacing possibilities presented to the human user is in danger of becoming too complex, and thus difficult to use (that is, not user-friendly).

The above problems are compounded by the fact that software products that provide a graphical user interface were not typically designed to handle the kind of "back access" interfacing required by automated testing tools. (That is, the graphical user interfaces of software products were designed with the understanding that users would access interface objects in normal fashion via the keyboard and mouse, not via program simulation). Because of this factor, it may be a complex matter to determine how to glean effective information from the application being tested.

Accordingly, while there are a variety of tools in the market today for automating the graphical user interface associated with software products, there is a general need in the art to provide an automation technique that is versatile, effective, but yet relatively easy to use.

SUMMARY

According to one exemplary implementation, an apparatus is described herein for interacting with a target software product having user interface functionality. The apparatus includes script execution logic configured to execute a script that involves interaction with the user interface functionality of the target software product. The apparatus further includes manipulation tool logic that provides functionality for use by the script application logic in interfacing with the target software product. The manipulation tool logic includes search logic configured to search for a user interface object using a plurality of different selectable search strategies.

According to another exemplary implementation, the manipulation tool logic is configured to interface with the target software product using a window-type application programming interface (API) and a COM-based accessibility interface.

According to another exemplary implementation, one of the above-referenced search strategies is a Structured Query Language (SQL) type query string search strategy that involves comparing a specified string with information associated with the user interface object.

According to another exemplary implementation, another of the search strategies is a flag-based attribute search strategy that involves comparing a specified attribute value and qualifying flag information with information associated with the user interface object.

According to another exemplary implementation, an apparatus is described for interacting with a target software product having user interface functionality. The apparatus comprises script execution logic configured to execute a script that involves interaction with the user interface functionality of the target software product. The apparatus further comprises manipulation tool logic that provides functionality for use by the script application logic in interacting with the target software product. The manipulation tool logic further comprises event handling logic configured to block the execution of the script execution logic until a specified event has occurred within a specified timeout period.

According to another exemplary implementation, the above-referenced event pertains to a firing of a specified user interface object.

According to another exemplary implementation, the manipulation tool logic further comprises event handling logic configured to execute a callback function upon the occurrence of a specified event, the callback function executing a prescribed function upon the occurrence of the specified event.

Related methods and computer readable media are also described herein.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

A. Exemplary Apparatus for Implementing an Automation Tool

A.1. Overview of Apparatus and Field of Use

Figure 1:
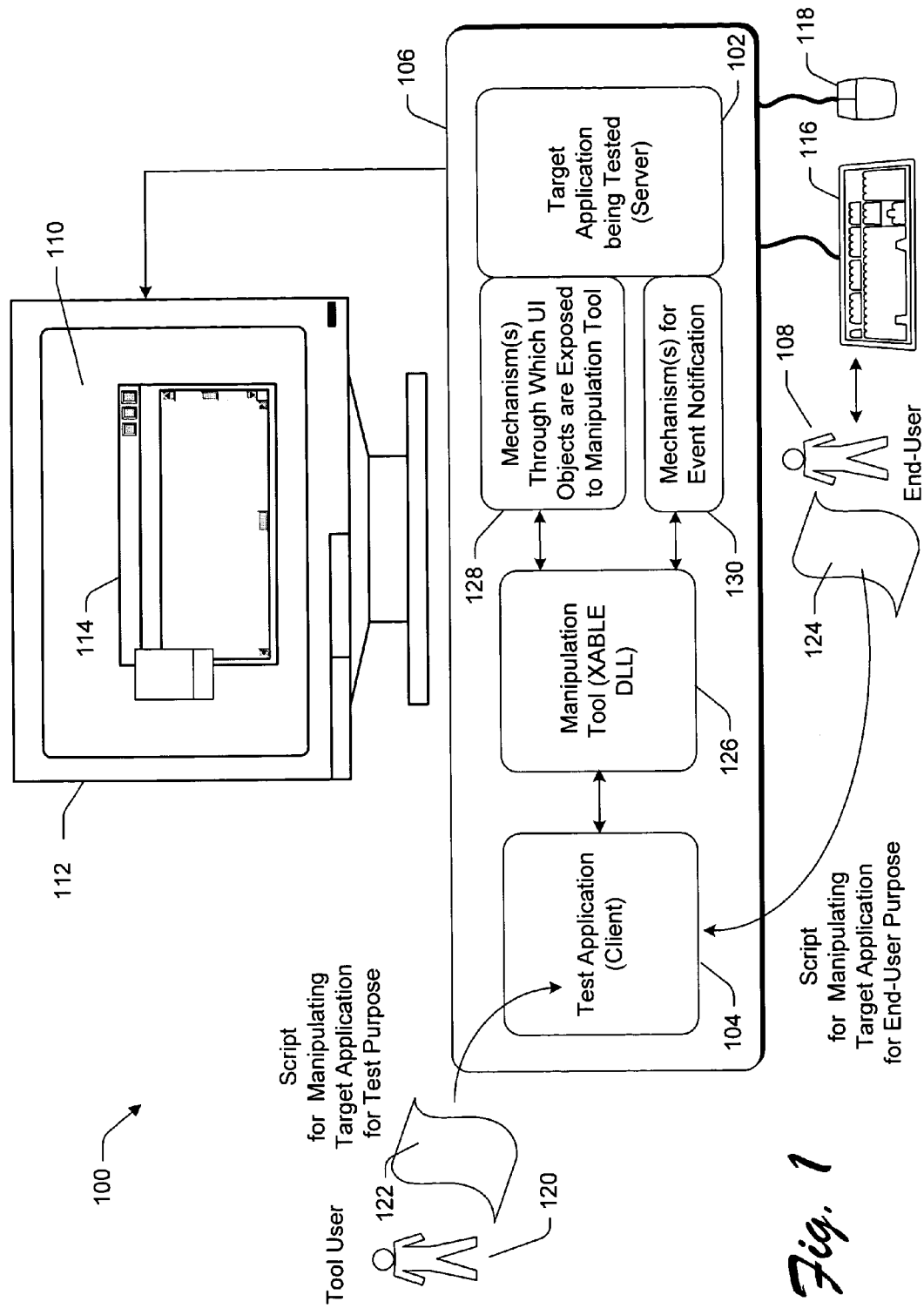
FIG. 1 shows an overview of an exemplary apparatus for implementing the automated testing of a software product (e.g., a target application).

FIG. 1 shows an exemplary apparatus 100 for implementing an automated technique for manipulating a software product. The technique involves a "target" application 102 and a "test" application 104 that execute on a processing device 106. The test application 104 drives the target application 102 so that it performs various functions that would normally be implemented in response to interaction with an end user 108. More specifically, in normal use, the end user 108 would interact with the target application 102 using conventional input mechanisms, such as a keyboard 116 and a mouse device 118. These interactions cause the generation of user interface objects ("UI objects") on a graphical user interface 110 of a display device 112, such as the familiar window-type object 114 (such as a window-type object provided by the Windows® operating system produced by Microsoft corporation of Redmond, Wash.). In one exemplary implementation, the window-type object can be manipulated using a set of function calls provided by Windows® operating system application programming interface (API). The goal of the testing application 104 is to mimic, or simulate, the above-described end user's 108 actions with the target application 102. As a result of this automation, the target application 102 executes various commands and presents graphical information as if it was being operated by the actual human end user 108. In this sense, the test application 104 can be considered as a kind of "auto-pilot" or "robot" which takes control of the target application 102 in place of the actual end user 108.

The above functionality is useful for many different applications. For instance, a tool user 120 may write a test script 122 to test the target application 102 to ensure that it performs its allotted functions in a reliable manner. Thus, the tool user 120 might wish to employ such automation when the target application 102 is first being developed. In this context, the automation can be used to run through a great number of user input scenarios to ensure that the target application 102 is working properly (using, for instance, well known iterative regression techniques). The outputs of the automated testing can be stored and compared with desired respective responses. Any discrepancies between the expected and observed results may be indicative of "bugs" in the target application 102. The tool user 120 can thus use this information to correct errors in the program before it ships to customers. The above-described automation is beneficial to the tool user 120 because it greatly expedites the testing process (which may involve hundreds of different scenarios). The automation may also provide more reliable testing results compared to manual testing, that is, by eliminating human error from the testing process.

The automation can be used for other purposes besides testing target applications 102. For instance, the end user 108 may find that his or her interaction with the graphical user interface 110 repeatedly involves one or more series of actions. For example, the end user 108 may find that he or she repeatedly performs the same series of actions in interacting with the graphical user interface 110 when handling e-mail on a daily basis. In this case, the end user 108 can write a script 124 to automate this common series of tasks. Thus, instead of having to perform multiple actions when interacting with the graphical user interface 110, the end user 108 only needs to initiate the execution of the test application 104, which automatically drives the target application 102, as if the end user 108 were manually performing the tasks in the automated sequence of tasks.

To facilitate discussion, any user who initiates the execution of the test application 104 is referred to as a "tool user" 120 herein. Likewise, again to facilitate discussion, the test application 104 will be discussed primarily herein as serving a conventional testing role, such as debugging or usability testing. However, as mentioned above, it should be appreciated that the test application 104 can serve other uses.

The target application 102 can represent any kind collection of machine instructions for performing any kind of application in any kind of programming language. Likewise, the scripts 102 and 124 can be prepared in a variety of programming languages, such as, to name a few, JSCRIPT™, JAVASCRIPT, VISUAL BASIC®, VISUALC++®, and so on. To facilitate discussion, most of the examples presented in this disclosure will be framed in the context of JSCRIPT; but this choice of language is merely illustrative. JSCRIPT was created by Microsoft Corporation. JSCRIPT is a scripting language tailored for use in Internet-related applications, and fully conforms to the ECMAScript (a Web standard scripting language).

Figure 5:
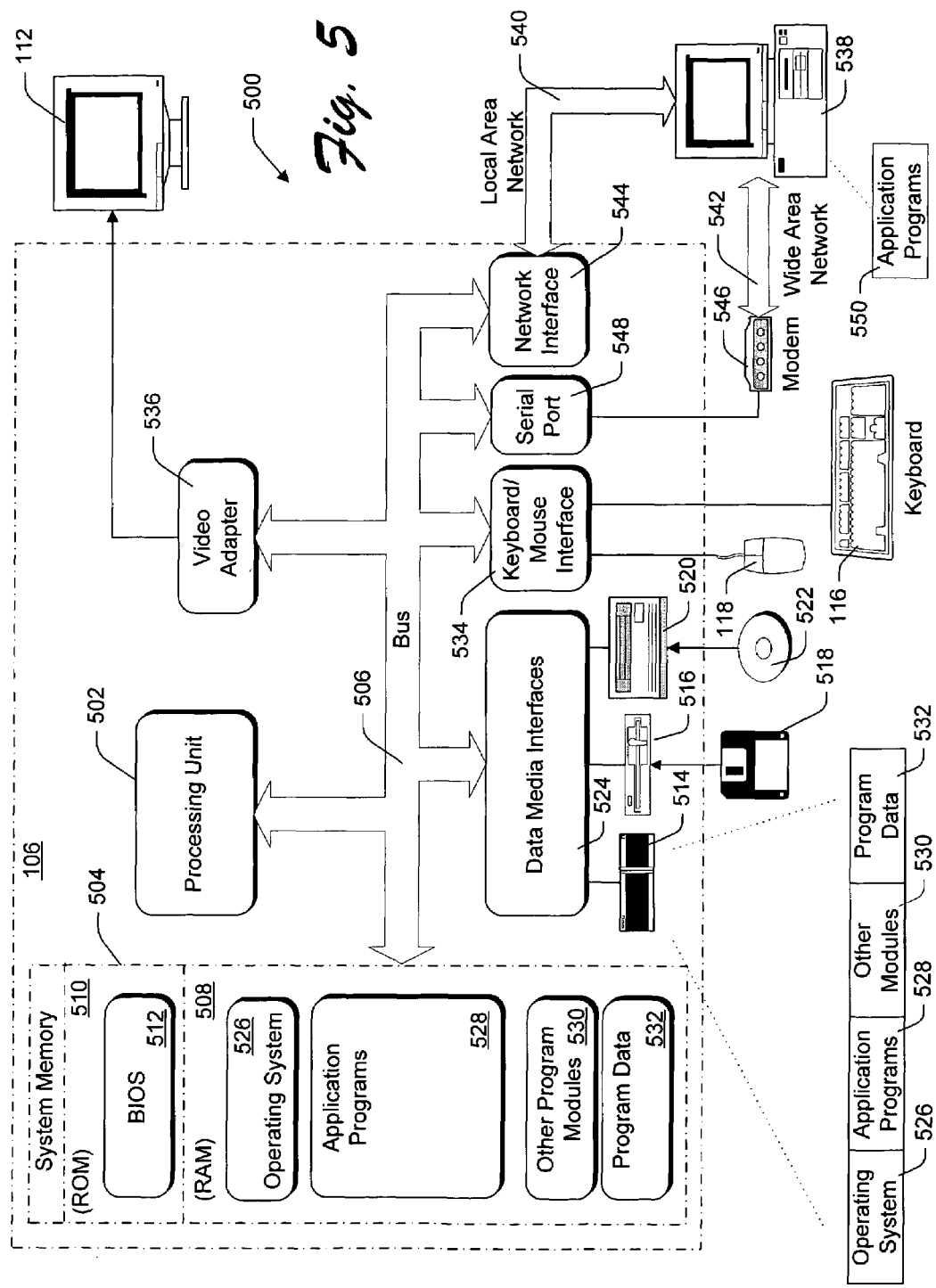
FIG. 5 shows an exemplary computing environment for implementing the apparatus shown in FIG. 1.
Figure 6:
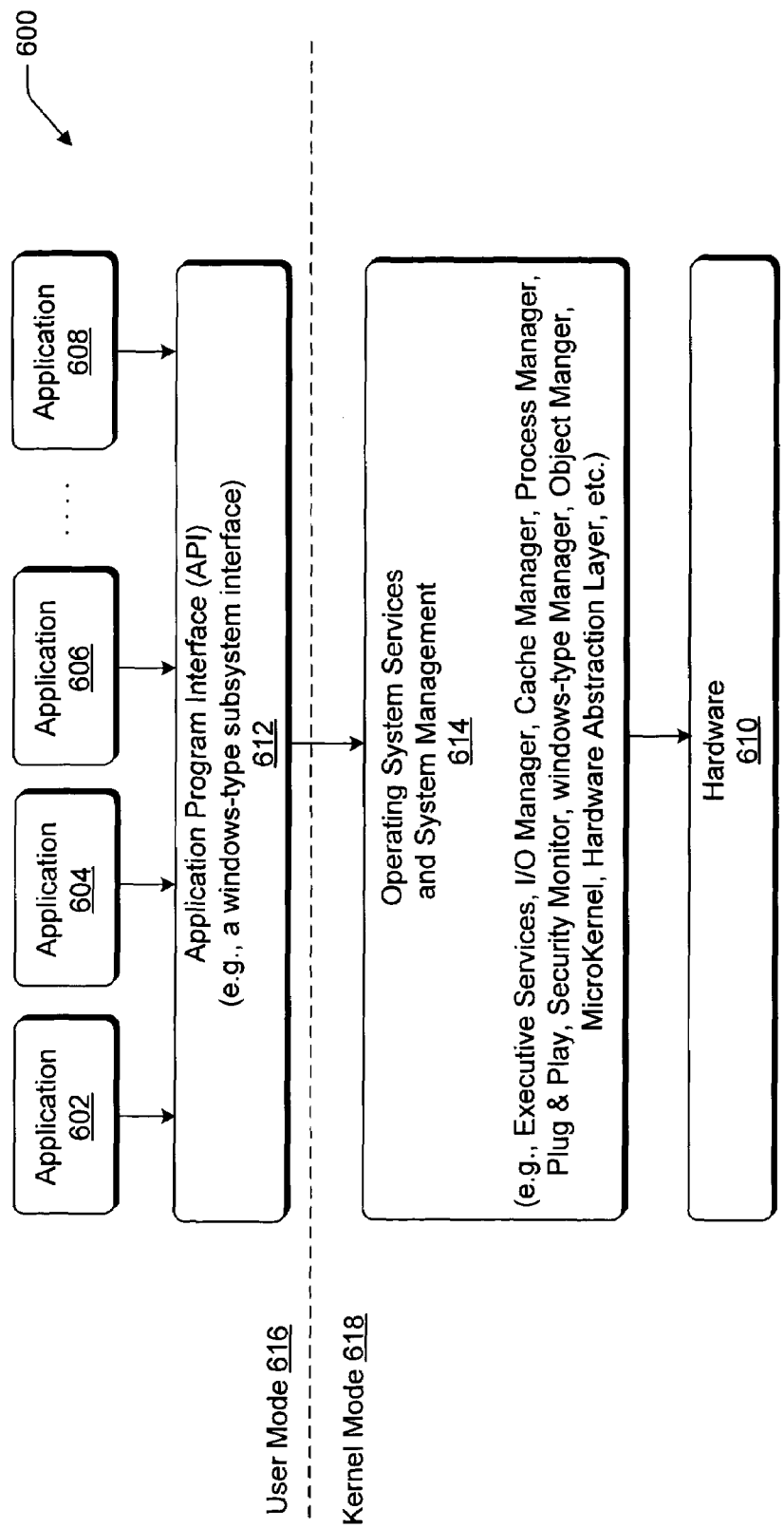
FIG. 6 shows a high level view of an exemplary operating system architecture for use in the computing environment shown in FIG. 5.

The processing device 106 can comprise any kind of device for executing machine instructions, such as a computer workstation, personal computer, and so on. The test application 104 can be implemented on the same physical computing machine as the target application 102. In an alternative implementation, the processing device 106 can represent plural functional modules embodied in separate processing devices, and possibly coupled together via network. For instance, the test application 104 can interact with the target application 102 via a network connection (not shown), such as the Internet, a LAN connection, etc. FIGS. 5 and 6 (to be discussed below) provide additional details regarding an exemplary computing environment that can be used to implement the automated testing technique described herein.

Finally, to provide a concrete framework for discussion, the discussion of the graphical user interface 110 is presented herein in the exemplary context of some version of Windows® operating system (provided by Microsoft Corporation). However, the automation techniques described here can be implemented on other kinds of operating systems that provide other kinds of user interface objects.

A.2. The Manipulation Tool and Related Interfaces

The tool used to implement the above-described automation is generically referred to as a "manipulation tool" 126. As a shorthand reference, this tool 126 is also referred to as the "XABLE tool." The manipulation tool (XABLE tool) 126 can be implemented as a COM component. COM (Component Object Model) refers to an OLE object-oriented programming model that defines how objects interact within a single process or between processes. (OLE, in turn, describes the technology and interface for implementing support for object interaction. OLE is an acronym for Object Linking and Embedding). In COM, clients have access to an object through interfaces implemented on the object. More specifically, the functionality provided by the manipulation tool 126 can be implemented using one or more dynamically linked libraries (DLL's). At run time, a function in a DLL is linked dynamically into an application that calls it.

As will be described in greater detail shortly, the manipulation tool 126 comprises a collection of objects used to interact with the target application 102, including a plurality of functions (or methods) used to interact with the target application 102. These functions are initiated in response to instructions contained within the tool user's 120 script 122. Accordingly, the manipulation tool 126 can be viewed as an interface between the test application 104 and the target application 102, or may alternatively be viewed as an instruction translator or instruction implementor.

However, in order for the manipulation tool 126 to interact with the target application 102, the target application 102 must itself provide an interface which "exposes" its objects. In other words, the manipulation tool 126 cannot "see" the graphical user interface 110 in the same manner as the end user can visually examine the graphical user interface 110. Accordingly, the manipulation tool 126 must have some mechanism for extracting information regarding the performance of the target application 102 as it affects the user interface (UI) of the target application 102.

To this end, the manipulation tool 126 interacts with the target application 102 through various interface mechanisms 128 which "expose" the UI objects provided by the target application 102. Different interface mechanisms 128 can be used to reveal this information. In one exemplary case, the manipulation tool 126 relies on two interface mechanisms: a window-type application program interface (API) and an "accessibility" interface designed to accommodate alternative techniques for accessing UI Objects. Each of these interfaces provides information regarding what is "happening" in the UI aspects of the target application 102 by exposing properties of the UI objects involved in the UI presentation as well as by firing events (e.g., sending messages) whenever something happens related to a UI object (to be discussed below). Each of these interfaces will be discussed in turn below.

An application program interface (or API) refers to a set of functions that are used to interact with a component, application, or operating system. Typically, an API consists of one or more DLL's that provide some specific functionality. For example, in a Microsoft® Windows®-based operating system environment, a frequently referred to API is the Windows® operating system API, which includes the DLLs that make up the Windows® operating system. Every Windows® operating system application interacts with the Windows® operating system API directly or indirectly. (The Win32® application programming interface version of the API will be discussed, by way of exemplary illustration, in this disclosure). The above-described Windows® API interface exposes a first set of information regarding the UI objects of the target application 102 to the manipulation tool 126. Also, the Win32® application program interface provides notifications called Windows® operating system "Messages" that provide information about UI window-type objects along with the changes that took place (to be discussed below).

On the other hand, the accessibility interface was originally designed in many systems to help disabled users operate a computer who might otherwise not be able to manipulate the keyboard and mouse device (e.g., 116, 118) of a conventional computer. More generally, the accessibility interface purposely exposes information associated with the generated UI of an application so that the user can interact with the UI using alternative means (that is, beside the conventional keyboard input and mouse input mechanisms, for instance). Microsoft® Active Accessibility® provides one such exemplary accessibility interface. Microsoft® Active Accessibility® is a COM-based technology that provides a standard, consistent mechanism for target applications and clients of such applications to exchange information. This technology is implemented as a dynamic-link library (DLL). The Active Accessibility® functionality provides an interface referred to as IACCESSIBLE, which constitutes the Active Accessibility® COM interface. The Active Accessibility® also generates notifications called WinEvents upon the occurrence of changes in the graphical objects presented to the graphical user interface 110. The above-described Active Accessibility® interface exposes a second set of information regarding the UI objects of the target application 102 to the manipulation tool 126, which complements the information provided in the first set by the Windows® API interface.

Additional details regarding the specific kinds of information revealed by the Win32® API interface and the Active Accessibility® interface will be described below. To facilitate discussion, and to indicate the application of the concepts described herein to other technology, the Win32® application programming interface will be referred to henceforth generically as a "window-type interface," and the Active Accessibility® interface will be referred to generically as an "accessibility interface." Interface objects that have a tile-like appearance are referred to generically as "window-like objects."

The processing device 106 also includes one or more mechanism(s) 130 for exposing event information pertaining to the operation of the target application 102. For instance, event information is generated by the target application 102 when it provides (or "fires") a particular UI object to the display device 112. Mechanism 130 notifies the test application 104 of such event information. In one case, mechanism 130 can extract the event information from standard window-type hook events. In another case, mechanism 130 can extract the event information from events signals generated via the accessibility interface. (In other words, in one exemplary implementation, the above-described Windows® operating system application program interface (API) and Active Accessibility® interface provide functionality for providing both of the mechanisms 128 and 130 shown in FIG. 1; the mechanisms 128 and 130 are shown separately mainly to highlight the ability of these interfaces to reveal both the properties of UI objects and event-related information regarding the UI objects.) There is typically a non-zero time lag between the request to launch a particular UI object and the firing of the requested UI object by the target application 102. Hence, the event information provided by the mechanism 130 can be employed to block the execution of test application 104 until a requested UI event is fired to the display device 112. Use of event information to monitor the firing of UI objects eliminates the need for fixed period delays in test scripts (referred to as "sleeps"). The events provided by the mechanism 130 are also useful in implementing a callback procedure. In the callback procedure, the manipulation tool 126 activates a predetermined function in response to the occurrence of a specified event.

Finally, note in FIG. 1 that the target application 102 is referred to as a server, while the test application 104 is referred to as a client. These labels reflect conventional labeling. The target application 102 is a server in the sense that it provides UI-related information to the test application 104 (which functions in the role of a receiving client of such information). In the parlance used in the field, the manipulation tool 126 actually "works out of process" with respect to the target application 102 which it controls.

A.3. UI Object Properties Exposed by the Manipulation Tool

As described above, the manipulation tool 126 models UI objects in the target application 102 using properties derived from exposed information provided by two interfaces, a window-type interface, and an accessibility interface. The meaning of these properties is best conveyed by providing an introductory explanation of conventional UI elements (with reference to FIGS. 2 and 3), and conventional representation of UI elements in object-oriented format (with reference to FIG. 4).

Figure 2:
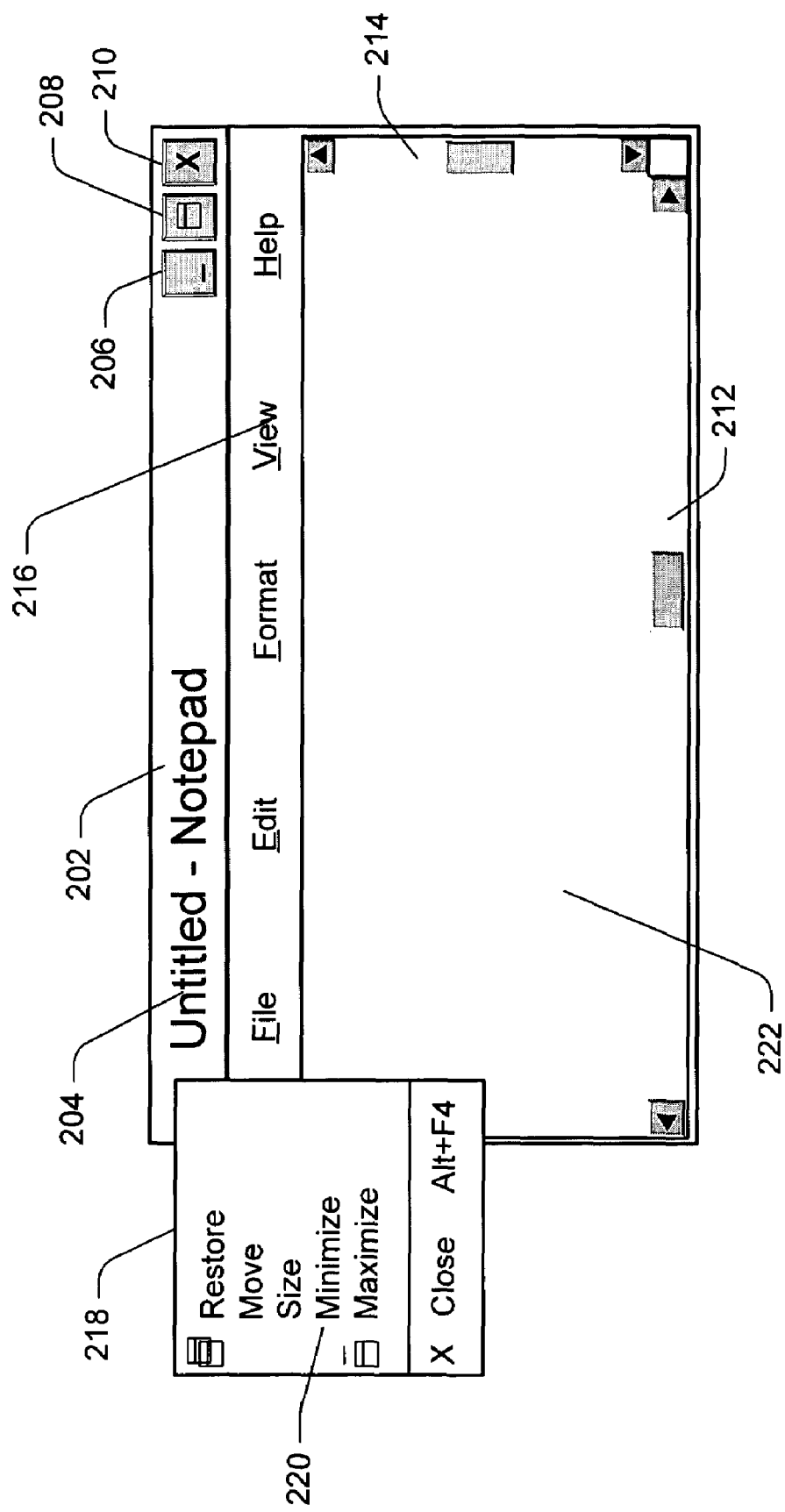
FIG. 2 shows an exemplary user interface object.

FIG. 2 shows a typical primary window-type object 200. The primary window-type object 200 consists of a title bar 202 (also referred to as the caption or caption bar) that identifies what is being viewed in the window-type object 200. That is, the title bar 202 extends across the width of the window-type object 200 at the top edge of the window-type object 200, inside its border. Window-type object title text 204 (also referred to as the "caption" of the window-type object) identifies the name of the object being viewed in the window-type object.

Title bar buttons (206, 208, 210) in the title bar 202 act as shortcuts to specific window-type object commands. In the case of FIG. 2, a minimize button 206 minimizes the window-type object 200, a maximize button 208 maximizes the window-type object 200, and a close button 210 closes the window-type object 200.

Every window-type object 200 has a boundary that defines its shape. A sizable window-type object 200 has a distinct border that provides control points (handles) for resizing the window-type object by using direct manipulation. If the window-type object cannot be resized, the border coincides with the edge of the window-type object. If the viewable content of the window-type object 200 exceeds the current size of the window-type object 200, scroll bars are used, such as an exemplary horizontal scroll bar 212 and a vertical scroll bar 214.

A menu bar 216 defines a special area displayed across the top of the window-type object 200 directly below the title bar 202. The menu bar 216 includes a set of entries called menu titles. Each menu title provides access to a drop-down menu composed of a collection of menu items, or choices.

More generally, menus display a list of commands available to the user. There are several types of menus, including drop-down menus, shortcut menus, and cascading menus. A drop-down menu appears as a panel with its list of items arranged in a column. Menu 218, for instance, is produced by right-clicking with the mouse device 118 while the mouse device 118 is pointed at the title bar 202. This menu 218 includes a plurality of menu items, such as exemplary menu item 220.

The interior of the window-type object 200 can be referred to as the client area 222. In this case, the client area 222 provides a workspace for entering information.

Figure 3:
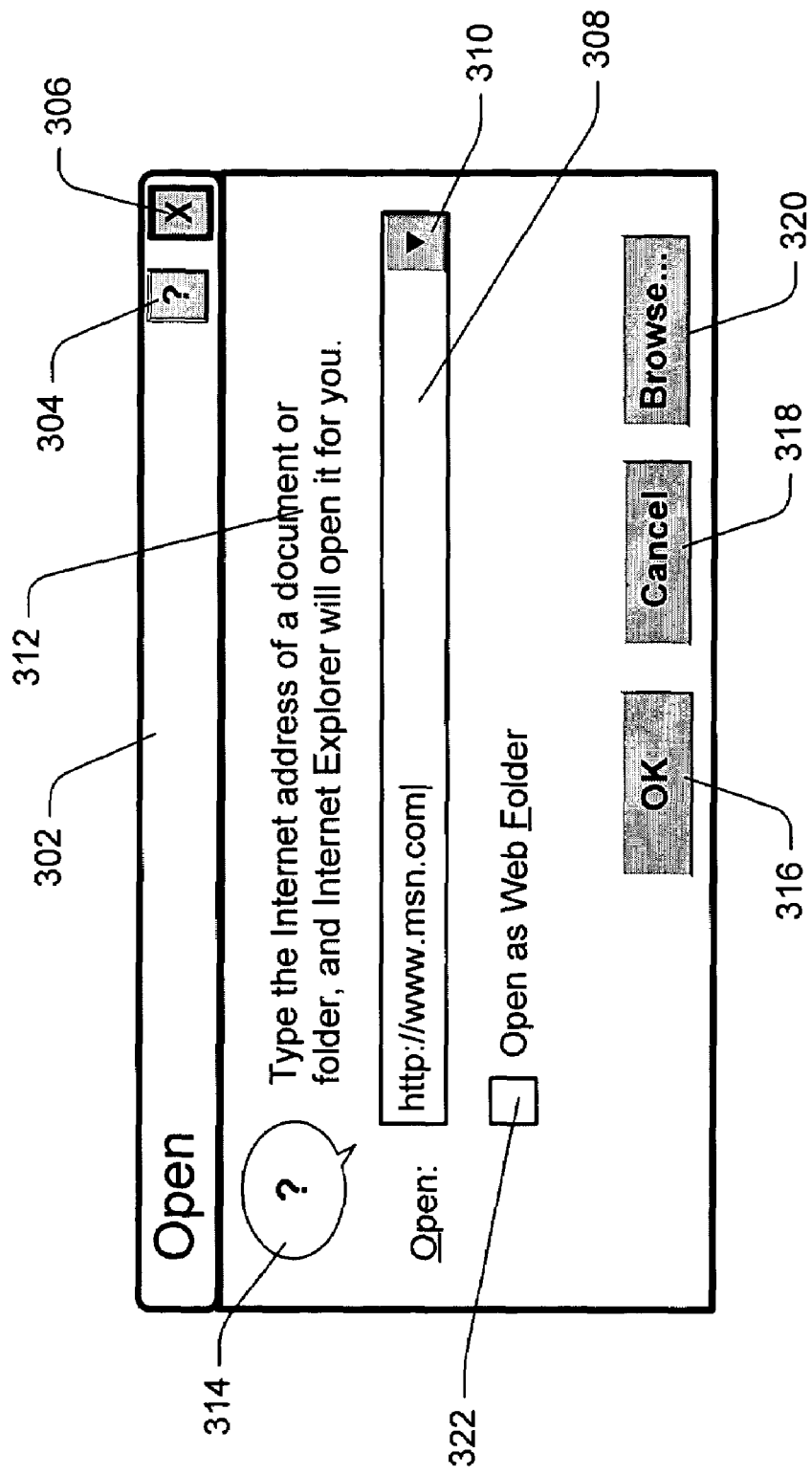
FIG. 3 shows another exemplary user interface object.

FIG. 3 provides another kind of UI object, referred to as a dialog box 300. The dialog box includes a title bar 302 and title bar buttons 304 and 306.

Generally, a window-type object can include a number of controls that facilitate displaying, entering, or editing a text value. For example, window-type object 300 includes a drop-down list box 308 that allows the selection of only a single item from a list. The list is displayed on demand by selecting the button 310. Although most list boxes are single-selection lists, some contexts require the user to choose more than one item. A tree view control is a special list box control (not shown) that displays a set of objects as an indented outline based on their logical hierarchical relationship.

Some of these controls combine a basic text-entry field with other types of controls, as in the case of drop-down list box 308, where the user can also enter text into the box, rather than select such text from the drop-down list. More generally, a text box (also referred to as an edit control) is a rectangular control where the user enters or edits text. It can be defined to support a single line or multiple lines of text.

In contrast, exemplary static text field 312 is used to present read-only information. A balloon type tip field 314 can be used to provide various types of prompting or help information to the user.

The dialog window-type object 300 also presents controls in the form of command buttons (316, 318, 320). These buttons (316, 318, 320) communicate an OK (i.e., acceptance) command, a cancel command, and a browse command, respectively, as well understood in the art. A command button, also referred to as a push button, is a control that causes the application to perform some action (e.g., by running some code associated with it) when the user clicks it.

Other kinds of well-known controls include option buttons and check boxes. An option button (not shown), also referred to as a radio button, represents a single choice within a limited set of mutually exclusive choices. That is, the user can choose only one of a set of options. A check box (e.g., check box 322) allows the user to enter a yes/no type of response in the box.

There are many additional types of well-known UI objects; the above listing of UI elements is merely an illustrative sample of UI objects commonly found in graphical user interfaces.

In the above discussion, UI features have been repeatedly referred to as UI "objects." This terminology reflects the well-known use of object-oriented programming metaphors to describe the features of graphical user interfaces. Since the object-oriented programming approach will be increasingly featured in this disclosure, FIG. 4 is included as a vehicle for briefly explaining high-level concepts pertaining to object-oriented programming.

Figure 4:
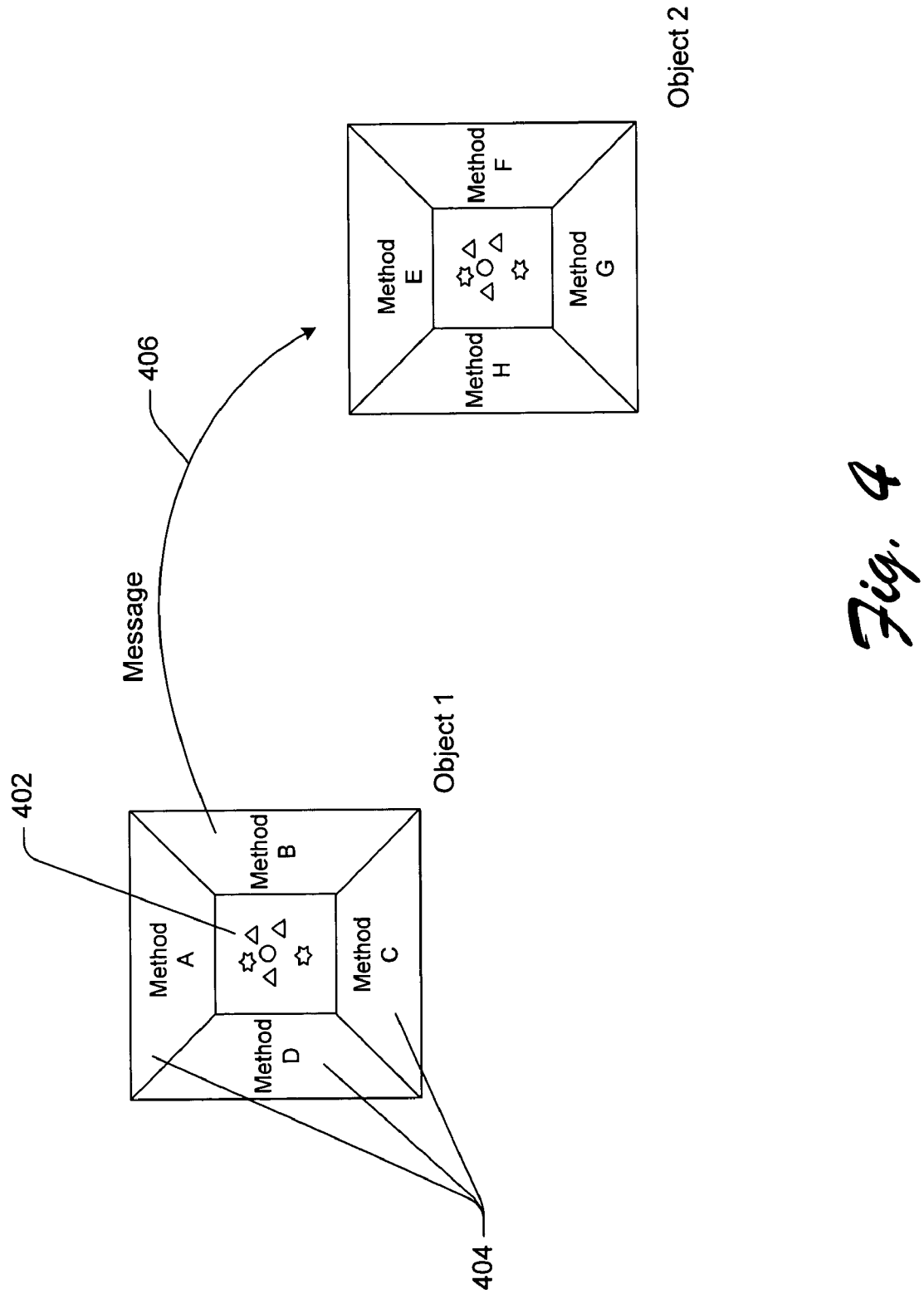
FIG. 4 shows a high-level diagram to illustrate key concepts in object-oriented programming.

Namely, FIG. 4 shows the representation of two user interface elements as objects (e.g., object 1 and object 2). Exemplary object 1 includes a plurality of properties 402 which convey attributes of the object (e.g., the characteristics or traits of the object). Object 1 also includes a collection of methods or functions associated therewith. The methods refer to behavior that can be exhibited by the object, or, in other words, functions that can be performed by the object. If an application attempts to strictly follow the object-oriented programming model (rather than loosely borrow from its concepts), it will attempt to encapsulate the properties 402 of the object within the methods 404, such that the properties cannot be changed without invoking an appropriate method of the object. (This encapsulation protects the data associated with the object and also helps produce the desirable result of a modular program, where changes to one module do not affect changes to another module.) Object 2 includes a conceptual organization which is similar to object 1. Object 1 communicates with object 2 via messages, such as message 406.

Although not illustrated, object-oriented programming also organizes objects in parent-child hierarchies whenever possible. A child inherits the properties of its parent. A class refers to a general "blueprint" which describes a collection of objects.

With the above introduction, a more detailed discussion is now provided of the types of information that can be gleaned from the target application 102 (in FIG. 1) via the interface mechanisms 128 and the manipulation tool (XABLE tool) 126. As mentioned, a first collection of properties is derived from information obtained via the window-type interface, and a second collection of properties is derived from information obtained via the accessibility interface. Tables 1 and 2 show exemplary collections of properties derived from these two mechanisms, respectively.

TABLE 1

Window-Type Properties

| Property Name | Description |
| --- | --- |
| WindowLevel | WindowLevel refers to the window-type object position relative to desktop. All top level window-type objects start at level zero and their children get higher level values. |
| ProcessId | ProcessId refers to the ID of the Process that created the window-type object. |
| ThreadId | Thread Id refers to the ID of Thread that created the window-type object. |
| hWnd | hWnd refers to the Handle of the window-type object, e.g., as assigned by the Windows ® operating system. |
| Text | The text attribute has two meanings depending on a "TextFlags" attribute:<br>1. If no "TextFlags" is specified, this attribute refers to the window-type object caption or title;<br>2. If "TextFlags" > 0 then this attribute refers to the Text within the window-type object, i.e., the text contained within its children. TextFlags allows tool user to specify which children to include or exclude. |
| ClassName | The ClassName attribute refers to the ClassName of the window-type object as specified in the WNDCLASS structure. |
| ModuleName | The ModuleName attributes refers to the name of the application that owns the window-type object, for example, "VB6.EXE". |

TABLE 2

Accessible Properties

| Property Name | Description |
| --- | --- |
| Name | The Name attribute refers to a string used to identify, find, or announce an object. Many objects, such as icons, menus, check boxes, combo boxes, and other controls have labels that are displayed to users. Any label that is displayed to a user is used for the object's name property. For example, the text on a button control is its name, while the name for a list box or edit control is the static text that immediately precedes the control in the tabbing order. Even graphic objects that do not display a name provide text when queried for the Name property. |
| Value | The Value attributes provides a textual representation of the visual information contained in an object. Not all objects support the Value property. For example, an edit control's value is the text it contains, whereas a menu item has no value. |
| Role | The Role property describes an object's user interface element. All objects support the Role property. In many cases, the object's role is obvious. For example, window-type objects have the xWindow role and push buttons have the xPushButton role. |
| RoleText | The RoleText attribute refers to a string that describes an object's role. For example: window-type objects have "Window" as its RoleText. |
| State | The State property describes an object's status at a moment in time. All objects support the State property. The state of a child is dependent on the state of its ancestors. |
| StateText | StateText refers to a string that describes an object's state. For example, a window-type object with the focus has "Focused" as part of its StateText. |

TABLE 2-continued

Accessible Properties

| Property Name | Description |
| --- | --- |
| ChildCount | ChildCount refers to the number of children that belong to this object. Window-type objects have at least 7 children. |
| DefaultAction | DefaultAction refers to a string that describes the object's default action. Not all objects have a default action. An object's DefaultAction property describes the object's primary method of manipulation from the user's viewpoint. For example, push buttons have the DefaultAction property set to "Press." |
| KeyboardShortcut | KeyboardShortcut property refers to a string that represents the shortcut key or access key, also known as the mnemonic. The KeyboardShortcut property describes a key or key combination that activates a specified accessible object. Examples include ALT+F, CTRL+ALT+4, WIN+F1, CTRL+ALT+SHIFT+BACKSPACE, or simply BACKSPACE. |
| Description | An object's Description property provides a textual description relating to an object's visual appearance. The description is primarily used to provide greater context for low-vision or blind users, but is also used for context searching or other applications. |
| Help | The Help property provides information that tells the user about the function of an object. This property contains balloon-style information that is used either to describe what the object does or how to use it. For example, the Help property for a toolbar button that shows a printer might provide the following text: "Prints the current document." The text for the Help property does not have to be unique within the user interface. |
| HelpTopic | The HelpTopic property provides details used with the Microsoft ® Win32 ® API WinHelp function to display a Help topic associated with the object. Not all objects support this property. |

Section B of this disclosure describes various techniques that can be used to search for UI Objects based on the above-described properties in Tables 1 and 2.

Finally, an illustration of how the above-described properties apply to a specific user interface object is presented in Table 3 below. Table 3 shows the various objects, properties, and values associated with the dialog box shown in FIG. 3. In this case, a combination of window-type and accessibility properties are used to describe the dialog window-type object.

TABLE 3

UI Objects and Properties for the Example of FIG. 3

| Object | Property | Value |
| --- | --- | --- |
| Dialog | Name | "Open" |
| Dialog | Caption | "Open" |
| Dialog | Text | "Type the Internet address of a document or folder, and Internet Explorer will open it for tool user.; &Open:; http://www.msn.com; http://www.msn.com; Open as Web &Folder; OK; Cancel; Browse . . ." |
| Dialog | Role | Window-type object |
| Dialog | ClassName | "#32770" |
| Edit control | Name | "&Open:" |
| Edit control | Value | "http://www.msn.com" |
| Edit control | Role | Editable text |
| Edit control | ClassName | "Edit" |
| OK button | Name | "OK" |
| OK button | Role | Push button |
| OK button | DefaultAction | "Press" |
| OK button | ClassName | "Button" |

A.4. Exemplary Computing Environment

FIG. 5 illustrates one example of a computing environment 500 within which the above-described software manipulation technique can be either fully or partially implemented. The computing environment 500 includes the general purpose computer 106 and display device 112 discussed in the context of FIG. 1. However, the computing environment 500 can include other kinds of computer and network architectures. For example, although not shown, the computer environment 500 can include hand-held or laptop devices, set top boxes, programmable consumer electronics, mainframe computers, gaming consoles, etc. Further, FIG. 5 shows elements of the computer environment 500 grouped together to facilitate discussion. However, the computing environment 500 can employ a distributed processing configuration. In a distributed computing environment, computing resources can be physically dispersed throughout the environment.

Exemplary computer 106 includes one or more processors or processing units 502, a system memory 504, and a bus 506. The bus 506 connects various system components together. For instance, the bus 506 connects the processor 502 to the system memory 504. The bus 506 can be implemented using any kind of bus structure or combination of bus structures, including a memory bus or memory controller, a peripheral bus, an accelerated graphics port, and a processor or local bus using any of a variety of bus architectures. For example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 106 can also include a variety of computer readable media, including a variety of types of volatile and non-volatile media, each of which can be removable or non-removable. For example, system memory 504 includes computer readable media in the form of volatile memory, such as random access memory (RAM) 508, and non-volatile memory, such as read only memory (ROM) 510. ROM 510 includes an input/output system (BIOS) 512 that contains the basic routines that help to transfer information between elements within computer 106, such as during start-up. RAM 508 typically contains data and/or program modules in a form that can be quickly accessed by processing unit 502.

Other kinds of computer storage media include a hard disk drive 514 for reading from and writing to a non-removable, non-volatile magnetic media, a magnetic disk drive 516 for reading from and writing to a removable, non-volatile magnetic disk 518 (e.g., a "floppy disk"), and an optical disk drive 520 for reading from and/or writing to a removable, non-volatile optical disk 522 such as a CD-ROM, DVD-ROM, or other optical media. The hard disk drive 514, magnetic disk drive 516, and optical disk drive 520 are each connected to the system bus 506 by one or more data media interfaces 524. Alternatively, the hard disk drive 514, magnetic disk drive 516, and optical disk drive 520 can be connected to the system bus 506 by a SCSI interface (not shown), or other coupling mechanism. Although not shown, the computer 106 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 106. For instance, the readable media can store an operating system 526, one or more application programs 528, other program modules 530, and program data 532.

The computer environment 500 can include a variety of input devices. For instance, the computer environment 500 includes the keyboard 116 and a pointing device 118 (e.g., a "mouse") for entering commands and information into computer 106. The computer environment 500 can include other input devices (not illustrated), such as a microphone, joystick, game pad, satellite dish, serial port, scanner, card reading devices, digital or video camera, etc. Input/output interfaces 534 couple the input devices to the processing unit 502. More generally, input devices can be coupled to the computer 106 through any kind of interface and bus structures, such as a parallel port, serial port, game port, universal serial bus (USB) port, etc.

The computer environment 500 also includes the display device 112, generally corresponding to the display device 112 shown in FIG. 1. A video adapter 536 couples the display device 112 to the bus 506. In addition to the display device 112, the computer environment 500 can include other output peripheral devices, such as speakers (not shown), a printer (not shown), etc.

Computer 106 can operate in a networked environment using logical connections to one or more remote computers, such as a remote computing device 538. The remote computing device 538 can comprise any kind of computer equipment, including a general purpose personal computer, portable computer, a server, a router, a network computer, a peer device or other common network node, etc. Remote computing device 538 can include all of the features discussed above with respect to computer 106, or some subset thereof.

Any type of network can be used to couple the computer 106 with remote computing device 538, such as a local area network (LAN) 540, or a wide area network (WAN) 542 (such as the Internet). When implemented in a LAN networking environment, the computer 106 connects to local network 540 via a network interface or adapter 544. When implemented in a WAN networking environment, the computer 106 can connect to the WAN 542 via a modem 546 or other connection strategy. The modem 546 can be located internal or external to computer 106, and can be connected to the bus 506 via serial I/O interfaces 548 other appropriate coupling mechanism. Although not illustrated, the computing environment 500 can provide wireless communication functionality for connecting computer 106 with remote computing device 538 (e.g., via modulated radio signals, modulated infrared signals, etc.).

In a networked environment, the computer 106 can draw from program modules stored in a remote memory storage device 550. Generally, the depiction of program modules as discrete blocks in FIG. 5 serves only to facilitate discussion; in actuality, the programs modules can be distributed over the computing environment 500, and this distribution can change in a dynamic fashion as the modules are executed by the processing unit 502.

Wherever physically stored, one or more memory modules 526, 528, 530, 532, etc. can be provided to implement the automating testing techniques described above.

FIG. 6 shows a well-known model for interfacing application programs (e.g., application programs 602, 604, 606, and 608) with hardware 610 via the application program interface (API) 612 and operating system services and system management module 614. The API interface 612 was discussed above. One feature of the API 612 is the Win32® API for specifically handing the window-type aspects of the program interface. The Operating System services and System Management Module 614 generally comprises conventional operating system modules, including, but not limited to, executive services, an I/O manager, a cache manager, a process manager, plug and play functionality, a security monitor, a window-type manager, an object manager, a microkernel, and a hardware abstraction layer (HAL). The operating system architecture is conventionally divided into user mode functionality 616 and kernel mode functionality 618. Additional details regarding the conventional operating system architecture shown in FIG. 6 can be found in multiple sources, including, for instance, David A. Solomon, *Inside Windows NT. Second Edition*, Microsoft Press, 1998.

B. Functionality Provided by the Manipulation Tool (XABLE Tool)

B.1. Overview of the Objects Provided by the Manipulation Tool (XABLE Tool)

Figure 7:
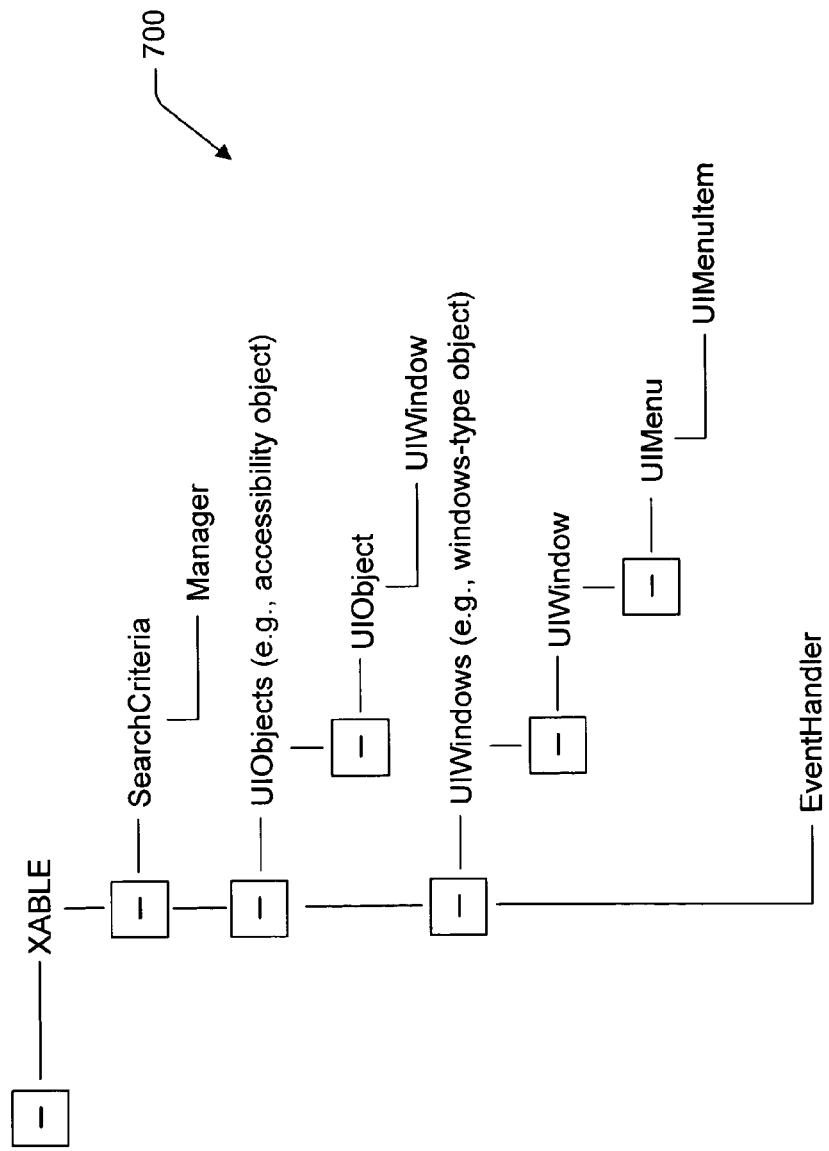
FIG. 7 shows the interrelationship between objects in a manipulation tool used to automate the testing of the target application.

The manipulation tool 126 (e.g., the "XABLE tool") provides a UI automation library that allows tool users to perform various functions. This section describes exemplary functions provided by the manipulation tool 126. (To facilitate explanation, the numeric references "126" and "120" will henceforth be omitted when discussing the manipulation tool and the tool user, respectively.) To begin with, however, an explanation will be provided of the overall organization of objects in the manipulation tool. FIG. 7 shows such an exemplary tree organization 700 of objects. As mentioned in the context of FIG. 4, an individual object has a collection of properties associated therewith. Further, an object may include one or more methods associated therewith. The methods generally refer to functions that the object can perform when called upon.

Table 4 below summarizes the basic roles assigned to each of the objects shown in FIG. 7.

TABLE 4

Basic Objects in the Manipulation Tool

| Object | Description |
| --- | --- |
| Manager | The Manager object allows access to all other objects. It therefore defines the "root" object. In one exemplary implementation, at least one object is required per script. |
| SearchCriteria | The SearchCriteria object defines a structure to be passed to a Find method when searching for UI Objects. |
| UIObject | The UIObject object defines UI objects constituted from information obtained from the accessibility interface (such as Microsoft's ® Active Accessibility ® interface). A UIObject can comprise a simple element, or a window-type object. Some UIObjects can be parents of other objects (e.g., containers). |
| UIObjects | The UIObjects object defines a collection of UIObjects. |
| UIWindow | The UIWindow object represents a window-type object or control object and encapsulates necessary properties and methods to access a window-type object. UIWindow objects are constituted from information obtained from the window-type interface (e.g., the Win32 ® application programming interface). |
| UIWindows | The UIWindows object defines a collection of UIWindow objects. |
| UIMenu | The UIMenu object defines a collection of UIMenuItem objects. |
| UIMenuItem | The UIMenuItem object maps to a single item on a menu or popup. |
| EventHandler | The EventHandler object provides a mechanism for waiting for or listening to events, and provides other timing-related functionality. |

By way of overview, with reference to the top levels of object hierarchy in the tree organization 700, the XABLE tool allows users to formulate scripts by using UI objects constituted through the window-type interface (using the UIWindow object) or through the accessibility interface (using the UIObject object). Further, a single script can employ a mix of objects derived from the window-type interface and the accessibility interface. The XABLE tool further includes the SearchCriteria object that defines a data structure for holding criteria used, for instance, in the searching functions provided by the XABLE tool. The XABLE tool further includes the EventHandler object to address synchronization issues that arise in writing test scripts.

To start using the XABLE tool, in one exemplary implementation, the tool user should create at least one Manager object. In JSCRIPT language notation, at least one manager can be created as follows.

var oManager = new ActiveXObject("XAble.Manager")

(The instruction "var" refers to the declaration of a variable in JSCRIPT.)

Once the tool user has created the Manager object, the user can search for window-type objects, dialogs and/or controls, or even simple UI elements. The tool user can write a script using the XABLE tool that waits for certain objects to appear or disappear, or that watches a certain attribute as it gets changed. Alternatively, the tool user can write a script that can set a callback function to be notified whenever a certain event takes place. The tool user can also write a script that sends keystrokes and mouse events to any object. All of these actions are accomplished using functions (or methods) associated with the above-identified objects of Table 4.

More specifically, the following subsections present details regarding selected aspects of the manipulation tool's functionality, including: Section B2 pertaining to searching functionality; Section B3 pertaining to event handling functionality (including "wait" functionality); Section B4 pertaining to keyboard and mouse functionality; Section B.5 pertaining to controls and control type functionality (e.g., button actuation); and Section B.6 pertaining to menu-related functionality. Section B.7 pertains to the automatic insertion of constants into scripts. Finally, the appendix to this disclosure provides additional details regarding the functionality provided by the manipulation tool. The appendix forms an integral part of this disclosure.

In the following discussion, the conventional object-oriented naming conventions are used to convey the relationships between and within objects. For instance, the relationship between an object and one of its properties or methods can be conveyed in the conventional manner using "object-.property," or "object.method." For instance, "oManager.Find ( )" makes reference to a method named "Find( )" associated with a manager object named "oManager." Also, as noted above, illustrative examples will be presented in the JSCRIPT language, but those skilled in the art will appreciate that other languages can be used to accomplish the same tasks.

B.2. Searching Functionality

The XABLE tool provides two general search methods for searching for UI objects: a Find method and a FindEx method. Both methods accept search parameters that describe the UI object being sought and return the sought UI object or a null value indicating that the search was unsuccessful. By way of overview, the FindEx search method provides a more versatile technique to find a UI object compared to the Find method. That is, the FindEx method gives the user more options in specifying information which identifies the sought-after UI object. Hence, for simple and straightforward applications, the tool user might want to use the Find method; but where more advanced searching is desired or required, the tool user might want to use the FindEx method.

Generally, the search parameters fed to the search functions include object attributes associated with the UI object. A property is considered an attribute if its value can uniquely identify the object. If one property is not sufficient, then multiple properties can be used to uniquely identify the object. More specifically, as described above in connection with Tables 1 and 2, object attributes fall into two categories: window-type properties and accessible properties. Searching can be slow and can potentially consume significant processing time. Accordingly, if a given object has unique window-type attributes, like Caption, hWnd, ClassName, ModuleName, etc., then, in one implementation, it may be considered preferable to use these attributes over the accessible attributes (such as Name, Value, Role, etc). It is possible to combine attributes from both categories, but search time will be dependent on the slowest attributes used. In one exemplary implementation, the default search behavior is to exclude hidden and/or disabled objects.

The above-described searching methods are associated with both the XAble.Manager and the XAble.UIOjbect objects (shown in FIG. 7 and described above in Section B.1). Using the searching method associated with XAble.Manager will cause the search to start on a global scope, e.g., the desktop. But if a tool user uses the searching methods associated with XAble.UIObject, then the search will look inside the specified object (direct children and descendants).

One beneficial feature of the XABLE tool is its versatility in allowing the tool user to search for UI objects in many different and powerful ways. Different exemplary search techniques are described below to illustrate the versatility of the search mechanism provided by the XABLE tool. The different search strategies can be categorized into at least two main techniques: a first technique that entails combining attribute values with flags to find a desired UI object; and a second technique that entails using a query string to find a desired UI object.

B.2.(a). Search Technique 1: Combining Attribute Values with Flags

The first search technique combines the UI object attribute values with flag information. The flags qualify the search for the attributes in different ways depending on the nature of the flags. That is, the flags can be viewed as performing a filtering function in the search, that is, by restricting the search results to a certain subset of results depending on the nature of the flags. Exemplary flags and their associated meanings are identified below in Table 5.

TABLE 5

Search Flags

| Flag(s) | Corresponding Object Attribute |
| --- | --- |
| XA_USE_TEXT<br>XA_USE_ANCESTORTEXT | These flags instruct the machine to perform the search within the text of a window-type object under consideration, or within the text in an ancestor object in the hierarchy of objects. |
| XA_USE_CLASS<br>XA_USE_ANCESTORCLASS | These flags instruct the machine to perform the search within ClassName related information. |
| XA_DIALOGS | N/A |
| XA_USE_MODULE | This flag instructs the machine to perform the search within ModuleName related information. |
| XA_USE_PROCESSID | This flag instructs the machine to perform the search in ProcessID related information. |
| XA_USE_THREADID | This flag instructs the machine to perform the search in ThreadID related information. |
| XA_HWND_CHILDREN<br>XA_HWND_PARENTS<br>XA_EXACT_HWND | These flags instruct the machine to perform the search in hWnd related information. |
| XA_EXACT_WINDOWLEVEL<br>XA_ABOVE_WINDOWLEVEL<br>XA_BELOW_WINDOWLEVEL | These flags instruct the machine to perform the search in WindowLevel related information. |
| XA_USE_NAME | This flag instructs the machine to perform the search in Name related information. |
| XA_USE_VALUE | This flag instructs the machine to perform the search in Value related information. |
| XA_USE_ROLE | This flag instructs the machine to perform the search in Role related information. |
| XA_USE_ROLETEXT | This flag instructs the machine to perform the search in RoleText related information. |
| XA_USE_STATE | This flag instructs the machine to perform the search in State related information. |
| XA_USE_STATETEXT | This flag instructs the machine to perform the search in StateText related information. |
| XA_USE_DEFAULTACTION | This flag instructs the machine to perform the search in DefaultAction related information. |
| XA_USE_KEYBOARDSHORTCUT | This flag instructs the machine to perform the search in KeyboardShortcut related information. |
| XA_USE_CHILDCOUNT | This flag instructs the machine to perform the search in ChildCount related information. |
| XA_USE_DESCRIPTION | This flag instructs the machine to perform the search in Description related information. |
| XA_USE_HELP | This flag instructs the machine to perform the search in Help related information. |
| XA_USE_HELPTOPIC | This flag instructs the machine to perform the search in HelpTopic related information. |

A number of examples are provided below to illustrate searching with attributes and flags using the Find and FindEx methods.

EXAMPLE (a)

The following example presents a technique for finding the word "CompanyX" in a UI object using the Find method. The Find method in this example is accessed through the Manager object (as indicated by the notation "oManger.Find( )."

//JSCRIPT sample using Find and combining flags with
  attributes as part of XAble.Manager

```
var UIFound = oManager.Find ( XA_USE_TEXT,
"*CompanyX*" );
```
In this case, the flag XA_USE_TEXT instructs the XABLE tool that it is to locate the word "CompanyX" in the text portion of UI objects provided by the test application.

EXAMPLE (b)

The following example presents a technique for performing the same operation described above using the FindEx method.
```
//JSCRIPT Sample using FindEx and combining flags with
attributes as part of XAble.Manager
oManager.Text = "*CompanyX*";
oManager.Flags = XA_USE_TEXT;
var UIFound = oManager.FindEx( );
```
In this case, the parameters passed to the find function (i.e., FindEx) are defined in separate statements that precede the find function.

EXAMPLE (c)

The next example presents a technique for performing a search by first creating a separate Criteria Object:
```
//JSCRIPT Sample using FindEx and combining flags with
attributes as part of SearchCriteria
var oSearchData = oManager.CreateSearchData( );
oSearchData.Text = "*CompanyX*";
oSearchData.Flags = XA_USE_TEXT;
var UIFound = oManager.FindEx( oSearchData );
//passing the oSearchData as parameter
```
In this case, the Criteria object, oSearchData, is defined, and then this object is passed as a parameter to the FindEx function. The object oSearchData contains a text field and a flag field.

In any of the cases above of using the Find or FindEx methods, Null is returned if no match is found. Further, if the tool user does not specify a XA_FINDALL flag (defined below), then the find methods will return immediately after a first match (single object). In contrast, if XA_FINDALL is specified, the search will return a collection of objects.

Table 6 describes additional flags that also affect the way the search methods operate. The examples which follow this Table illustrate the use of these flags.

TABLE 6

Additional Search Flags

| Flag | Description |
|---|---|
| XA_FIND_PARTIALMATCH | This flag instructs the machine to find object(s) that have a partial match (e.g., in case more than one flag was specified). |
| XA_FINDALL | This flag instructs the machine to find all objects that match by returning a collection of matching objects. |
| XA_FINDRECURSIVE | This flag instructs the machine to search all descendants of an object by walking through the tree of children. |
| XA_FIND_CASESENSITIVE | This flag instructs the machine to match exact text (string) case. |

EXAMPLE (d)

The following two examples illustrate two respective techniques used to find all top level objects having the text "CompanyX" in their respective captions.

```
oManager.Text = "*CompanyX*";
oManager.Flags = XA_USE_TEXT | XA_FINDALL;
var UIFound = oManager.FindEx( );
```
OR
```
var UIFound = oManager.Find (XA_USE_TEXT,
"*CompanyX*", XA_FINDALL);
```
In these examples, the XA_FINDALL flag instructs the machine to find all top level objects that match by returning a collection of matching objects (in this case, a collection of objects that contain the word "CompanyX").

EXAMPLE (e)

The next two examples illustrate techniques to find all objects with the "CompanyX" caption (that is, not simply top level objects):
```
oManager.Text = "*CompanyX*";
oManager.Flags = XA_USE_TEXT | XA_FINDALL |
XA_FINDRECURSIVE;
var UIFound = oManager.FindEx( );
```
OR
```
var UIFound = /oManager.Find (XA_USE_TEXT,
"*CompanyX*", XA_FINDALL | XA_FINDRECUR-
SIVE);
```
Again, the flag XA_FINDALL flag instructs the machine to find all objects that match by returning a collection of matching objects. The XA_FINDRECURSIVE flag instructs the machine to search all descendants of an object by walking through the tree of children.

EXAMPLE (f)

The following example presents a technique for using the SearchCriteria object in performing the search, as opposed to using the manager as criteria.
```
Var oSearchData = g_oUIManager.CreateSearchData( );
oSearchData.Text = "* CompanyX*";
oSearchData.Flags = XA_USE_TEXT | XA_FINDALL;
var UIFound = oManager.FindEx(oSearchData);
```
In this case, a search criteria object "oSearchData" is created and then passed as a parameter to FindEx.

EXAMPLE (g)

The following example presents a technique to find top level application objects (with disabled and hidden objects excluded):
```
var UIFound = oManager.Find(XA_FINDALL );
```
In this case, since there is no other qualifier than XA_FINDALL, this function instructs the machine to find all objects in the system. However, the default is not to include hidden and disabled objects, so this function will exclude these objects from the collection of returned objects. This function will also not retrieve information from child objects.

EXAMPLE (h)

The following example presents a technique to find all top level application objects (including hidden and disabled objects):
```
var UIFound = oManager.Find( XA_FINDALL |
XA_INCLUDE_DISABLED | XA_INCLUDE_HID-
DEN );
```
In this case, the flags XA XA_INCLUDE_DISABLED and XA_INCLUDE_HIDDEN ensure the retrieval of hidden and disabled objects.

EXAMPLE (i)

The following example presents a technique to find all objects in the system.

var UIFound = oManager.Find( XA_FINDALL | XA_FINDRECURSIVE| XA_INCLUDE_DISABLED | XA_INCLUDE_HIDDEN );

In this case, the additional inclusion of the XA_FINDRECURSIVE flag ensures that even the objects associated with child objects are retrieved.

B.2.(b). Technique 2: Using Query-Like String Search

A second category of search techniques provides for the use of a query-like string in searching for UI objects. This technique allows the tool user to search for a UI object using a search query structure similar to Structured Query Language (SQL) used to interrogate databases. In the present application, however, the searching is performed in memory, not in a remote database. In one exemplary implementation, only the FindEx method supports the query-like search technique.

EXAMPLE (j)

The following example presents a technique to find the first object having the "CompanyX" caption.

var UIFound = oManager.FindEx("Caption like '*CompanyX*' ");

In this case, the search parameter provides a key phrase "Caption," a relational operator "like," followed by the string "CompanyX," which prompts the machine to use a SQL-like search to find the UI objects containing the text "CompanyX." Only the first found object is retrieved. The keyword "Caption" specifically directs the machine to find a matching object by investigating the title (i.e., caption) of the UI objects.

EXAMPLE (k)

The following example illustrates a technique to find all top level objects with the "CompanyX" caption.

var UIFound = oManager.FindEx("Caption like '*CompanyX*' ", XA_FINDALL );

In this case, the inclusion of the flag XA_FINDALL prompts the machine to retrieve all top level objects that contain the text "CompanyX," not simply the first found object.

EXAMPLE (l)

The following example illustrates a technique to find all objects having the "CompanyX" caption.

var UIFound = oManager.FindEx("Caption like '*CompanyX*' ", XA_FINDALL | XA_FINDRECURSIVE);

In this case, the inclusion of the flag XA_FINDRECURSIVE supplements the search in the previous example by also finding matching child objects.

EXAMPLE (m)

The following example presents a technique to find any object with "CompanyX" as part of its text.

var UIFound = oManager.FindEx("Text like '*Companyx*'");

In this case, the FindEx method instructs the machine to find an object having the text "CompanyX" inside one of its children. This is accomplished using the "Text" keyword, as indicated above (e.g., instead of the "Caption" keyword, which only examines the titles of the UI objects).

EXAMPLE (n)

The following example presents a technique to find all top level objects with "CompanyX" as part of their text.

var UIFound = oManager.FindEx("Text like '*CompanyX*' ", XA_FINDALL );

This case differs from the preceding case by including the XA_FINDALL flag, which instructs the machine to find all of the top level matching UI objects, not just the first matching UI object.

EXAMPLE (o)

The following example presents a technique to find all objects with "CompanyX" as part of their text.

var UIFound = oManager.FindEx("Text like '*CompanyX*' ", XA_FINDALL | XA_FINDRECURSIVE );

This case differs from the proceeding case by including the flag XA_FINDRECURSIVE, which prompts the machine to find all of the child objects, not just the top level objects.

In addition to the above examples, the XABLE tool allows the tool user to search for objects by looking into text portions of one or more of their children (controls and child window-type objects). Tool users can inform XABLE tool that they want to include child window-type objects in their search for a window-type object by using the TextFlags property. TextFlags can be set to one or more of the following exemplary values.

TABLE 7

| TextFlag | Description |
| --- | --- |
| TF_INCLUDE_TITLE | This flag instructs the machine to include the window-type object's title in the search. |
| TF_INCLUDE_STATIC | This flag instructs the machine to include the static child window-type object's captions in the search. |
| TF_INCLUDE_EDIT | This flag instructs the machine to include Edit controls text in the search. |
| TF_INCLUDE_PUSHBUTTONS | This flag instructs the machine to include the Push buttons caption in the search. |
| TF_INCLUDE_RADIOBUTTONS | This flag instructs the machine to include Radio button controls text in the search. |

TextFlag Descriptions

TABLE 7-continued

TextFlag Descriptions

| TextFlag | Description |
| --- | --- |
| TF_INCLUDE_CHECKBOXES | This flag instructs the machine to include check boxes text in the search. |
| TF_INCLUDE_GROUPBOXES | This flag instructs the machine to include group boxes text in the search. |
| TF_INCLUDE_LISTTEXT | The flag instructs the machine to include text from a list box in the search. |
| TF_INCLUDE_HTMLELEMENTS | This flag instructs the machine to include HTML text in the search. This is useful for window-type objects that support HTML text. |
| TF_INCLUDE_HIDDEN | This flag instructs the machine to include hidden window-type object text in the search |
| TF_INCLUDE_DISABLED | This flag instructs the machine to include disabled window-type object text in the search. |
| TF_INCLUDE_LISTITEMSELECTED | This flag instructs the machine to include a selected item in a list box control's text in the search. |
| TF_REMOVE_NONPRINTABLE | This flag instructs the machine to remove all non-printable characters from the text while searching. |
| TF_TRIM_SPACES | This flag instructs the machine to remove spaces while searching. |
| TF_MAKE_UPPER | This flag instructs the machine to make all text upper case. |
| TF_REMOVE_AMPERSAND | This flag instructs the machine to remove all "&" signs from the text. |

TextFlags can also be set to one or more of the following values, which are combinations of the above flags.

TABLE 8

TextFlag Combinations

| TextFlag | Description |
| --- | --- |
| TF_INCLUDE_ALLCONTROLS | This flag instructs the machine to include the text portion of all child controls in the search. |
| TF_INCLUDE_BUTTONS | This flag instructs the machine to include text from all types of buttons, e.g., push buttons, radios, etc. |
| TF_INCLUDE_ALLINTERACTIVE | This flag refers to a combination of TF_INCLUDETITLE; TF_INCLUDEALLCONTROLS; TF_REMOVENONPRINTABLE; and TF_TRIMSPACES. |
| TF_INCLUDE_ALL | This flag refers to a combination of: TF_INCLUDEALLINTERACTIVE; TF_INCLUDEHIDDEN; and TF_INCLUDEDISABLED. |

In one exemplary implementation, TextFlags can be used with XA_USE_TEXT only.

EXAMPLE (p)

The following example presents a technique for searching for all window-type objects that have "OK" buttons.
oManager.Text = "*OK*";
oManager.Flags = XA_USE_TEXT;
oManager.TextFlags = TF_INCLUDEBUTTONS;
var UIFound = oManager.FindEx( );

In this case, the TF_INCLUDEBUTTONS flag instructs the machine to include text from all types of buttons, e.g., push buttons, radios, etc. in the search.

In any of the examples described above, wildcards (e.g., "*") can be used in the search terms to encompass a potentially greater number of matching UI objects. Further, the query technique supports the use of well known logical connectors in formulating queries, such as the logical AND, OR, NOT, and so on.

The above-identified two basic search techniques (i.e., techniques 1 and 2) are not exhaustive of the strategies that can be used to locate UI objects, as reflected by the two additional examples.

EXAMPLE (q)

The following example shows the use of a Subitem object to locate a button containing the text "OK."
Var oOKbutton = oDialog.SubItem("OK")
The "SubItem" expression will locate all children objects associated with a specified object. "Item" will locate only top level objects.

EXAMPLE (r)

The following two examples show the use of a "for" loop to explicitly perform a recursive search for buttons containing the "OK" text.
Var oButtons = oDialog.Decendants(xPushbutton); //All button descendents
for (i=0; I < oBuuttons.Count; ++i)
{
if (oButtons(i).Name == "OK"
{
  oOKButton = oButtons(i);
  break;
}
}
OR
for (i=0; I < nitems; ++i)
{
if (oDialog.SubItem(i).Name == "OK")
}
  oOKButton == oButtons(i);
  break;
}
}

In these cases, the tool user explicitly iteratively sequences through a collection of UI objects to find UI objects with buttons containing the text "OK." This can be viewed as the "brute force" method to finding matching objects, which may be desirable if the tool user wishes to override one or more of the assumptions employed by the Find and FindEx methods described above.

Figure 8:
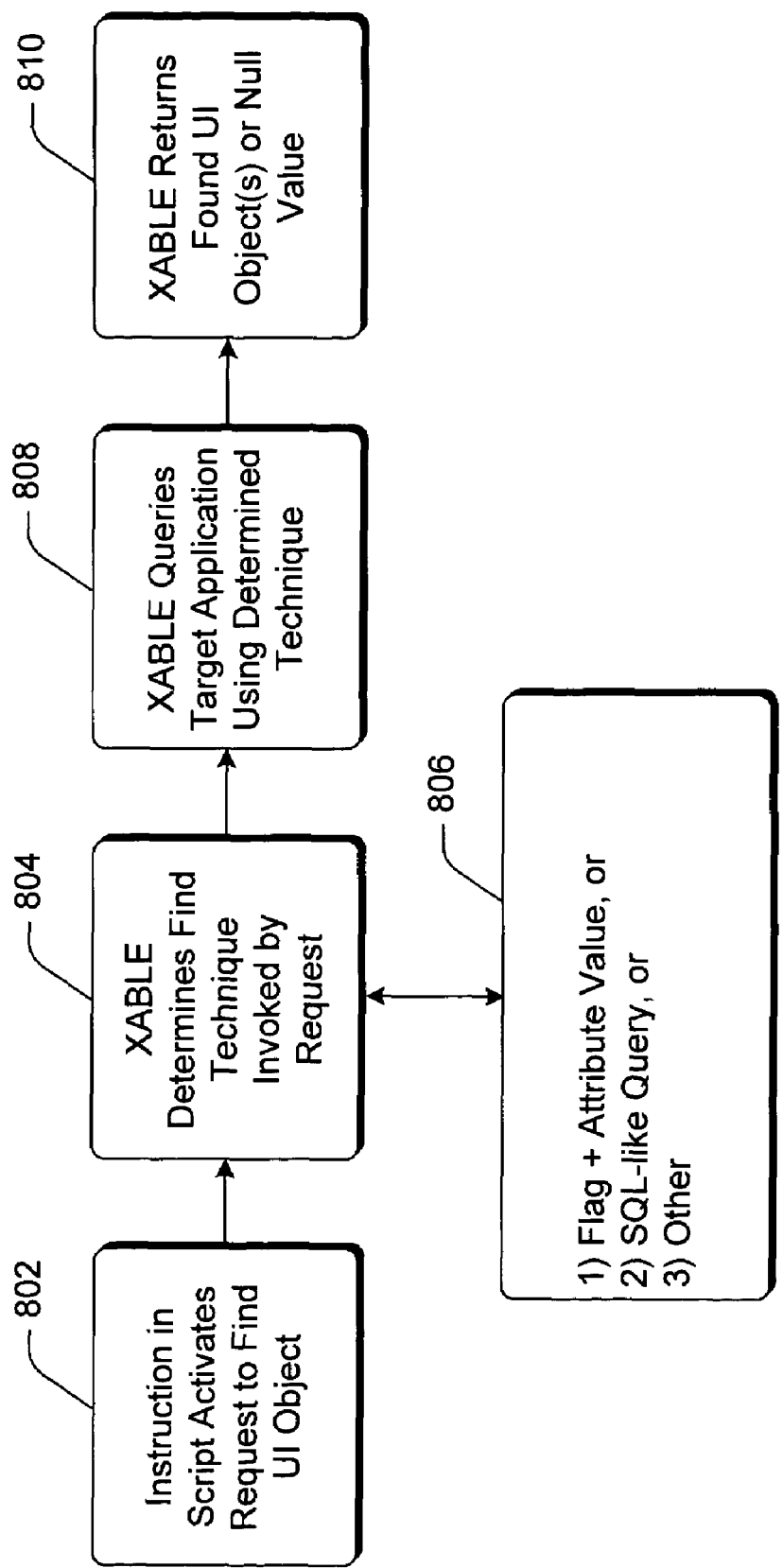
FIG. 8 shows an exemplary procedure for finding a UI object using the manipulation tool shown in FIG. 7.

FIG. 8 summarizes the above discussion by showing an exemplary high-level procedure for finding a UI object using the XABLE manipulation tool. In step 802, an instruction in the script activates a request to find a specified UI object. In step 804, the XABLE tool determines the particular search technique that is invoked by the instruction in the script. As indicated in block 806, and as discussed above, a first technique may identify the requested UI object by providing one or more flags coupled with an attribute value. A second technique may identify the requested UI object by specifying an SQL-like query string. A third technique may rely on some other methodology to find the requested UI object. In step 808, the XAble tool queries the target application using the ascertained technique. In step 810, the XABLE tool returns one or more UI objects that satisfy the search. Alternatively, XABLE tool returns the null value if there are no UI objects that satisfy the search.

B.3. Events and Event Handling

The XABLE tool provides event monitoring functionality that can be used to stall the execution of a script until a predetermined event has taken place. This can be accomplished using the Wait and WaitEx functions. As in the case of the Find and FindEx methods, the WaitEx function generally provides a more versatile technique, e.g., containing more options, than the Wait method. For example, the WaitEx function allows the tool user to search using SQL-like string expressions. In general, these waiting functions inhibit the execution of the script that follows the waiting functions until the conditions specified in the functions are satisfied. In addition, these functions allow the tool user to specific a maximum waiting time (in milliseconds), which defines a timeout period. If the timeout period expires, null (nothing) is returned. The following examples illustrate the use of the Wait and WaitEx methods.

EXAMPLE (a)

The following example presents a technique for waiting until the Internet Searcher application is launched (e.g., the main window-type object becomes visible) or a 10 second period elapses. The 10 second period is entered as 10000 ms in the example below.

oSrchData = oManager.CreateSearchData( );
    oSrchData.Text = "*CompanyX Internet Searcher*";
    oSrchData Flags = XA_USE_TEXT;
    var UIFound = oManager.WaitEx(evtObjectShow, oSrchData, 10000); //Wait is blocking for 10 sec
    if ( UIFound )
    {
    //Do something with the object found . . .
    }
    else
    {
    //Timed out
    //Either the object is non-existent
    //Or the 10 sec period was insufficient
    }

Note that evtObjectShow is used to tell XABLE tool to check for the object show event and to see if it comes from the attached object (e.g., passed in oSrchData). That is, this statement has the effect of filtering the event information generated by the target application and selecting specific events therefrom. If the tool user omits the 10000 in this example, then the Wait function is not time-bounded.

EXAMPLE (b)

The tool user can re-write the above example in a more straightforward way if the tool user uses Wait with an SQL-like string instead of oSrcData. The following example presents a technique for searching using such an SQL-like string.

var UIFound = oManager.Wait(evtObjectShow, "Caption like '*CompanyX Internet Searcher*'", 10000);
    //Wait is blocking . . .
    if ( UIFound )
    {
    //Do something . . .
    }
    else
    {
    //Timed out
    }

Figure 9:
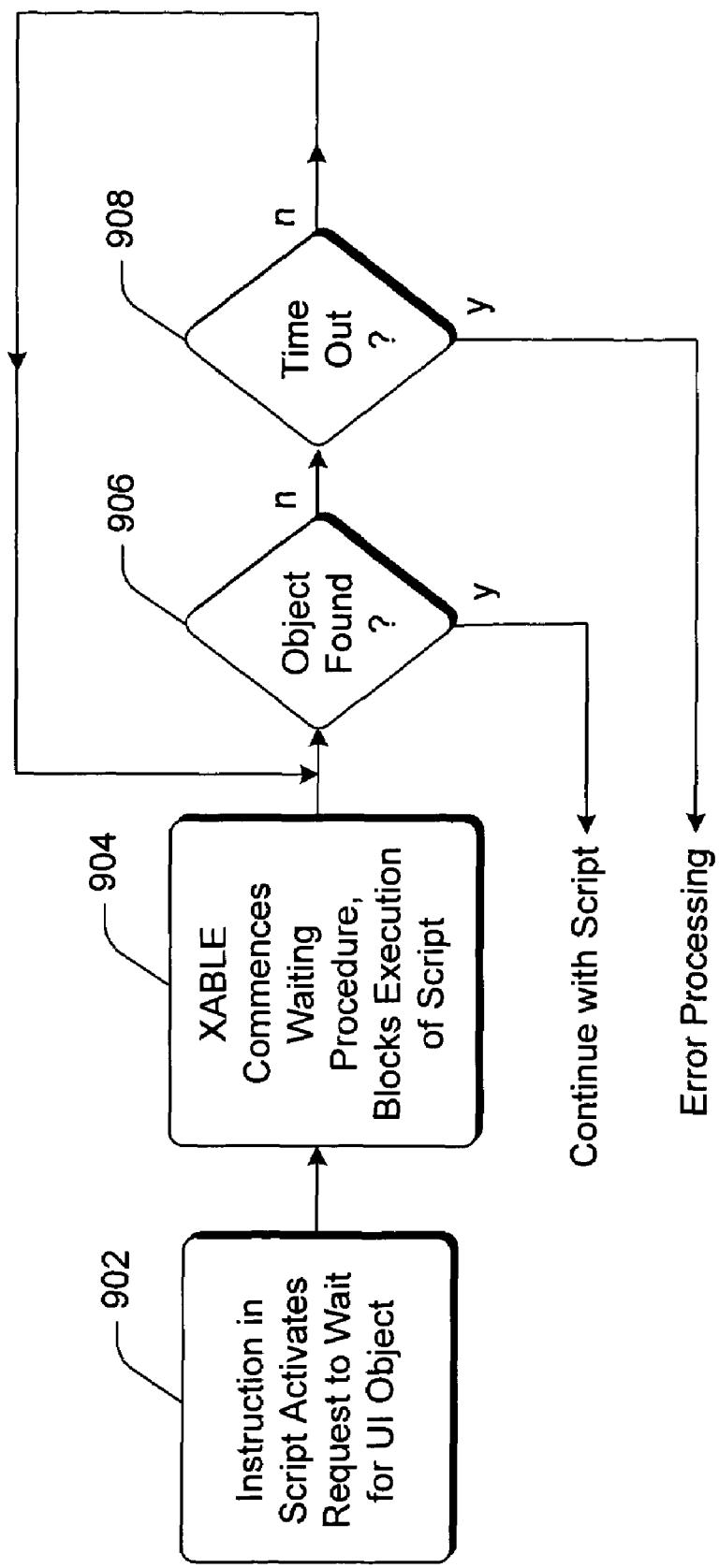
FIG. 9 shows an exemplary procedure for waiting for a UI object using the manipulation tool shown in FIG. 7.

FIG. 9 summarizes the above discussion by showing an exemplary high-level procedure for waiting for a specified UI object using the XABLE manipulation tool. In step 902, an instruction in the test script activates a request to wait for the specified UI object (e.g., using the above-described Wait or WaitEx methods). In step 904, XABLE tool commences the waiting procedure, which effectively halts the execution of the script (so that instructions that appear after the Wait or WaitEx methods are not executed). In step 906, XABLE tool determines whether the specified UI object has been activated. For instance, in the case that the specified UI object is a window-type object, step 906 entails determining whether this window-type object has been activated. The firing of the window-type object can be detected through the mechanism 130 shown in FIG. 1. If the UI object has not been detected, then, in step 908, the XABLE tool determines whether a timeout period specified in the Wait or WaitEx methods has elapsed. If the timeout period has not elapsed, then the XABLE tool will repeat steps 906 and 908 until either the requested UI object has been found, or the timeout period has elapsed. If the requested UI object has been found, then the execution of the script resumes by performing the instructions that follow the Wait or WaitEx methods. If the timeout period has elapsed, then, in one exemplary implementation, error processing is performed (such as the generation of an error message, etc.).

In addition to the above Wait and WaitEx functions, the XABLE tool includes a generic event handler object (e.g., EventHandler) that allows the tool user to wait for any event caused by UI elements, like changes in text, size, or any visual attributes such as show and hide states, and so on. The event handler object can be created in the following expression.

var oEventHandler = new
    ActiveXObject("XAble.EventHandler");

In one exemplary implementation, the event handler will not monitor any events until a Start method is called. First, the tool user needs to specify which events are of interest to the tool user by calling an AddEvent method for each event. The tool user can then choose to wait for the specified events by using the Wait method. To stop receiving additional events, the tool user employs a Stop method.

Further, the tool user can also add callback functions in their script to be called whenever a certain event happens. More specifically, callback functions specify that the XABLE tool is to perform an identified method or function upon the occurrence of a specific event (or events).

Table 9 presents further details regarding exemplary functional capabilities of the event handler object aspects of the XABLE tool.

In the above example, AddObserver registers the OnNotification function in the tool user's script. AddEvents adds an event that the XABLE tool is instructed to "listen" to. The function OnNotification will be invoked whenever the conditions specified in the OnNotification parameters are satisfied.

TABLE 9

EventHandler object details

| Method | Description |
| --- | --- |
| AddObserver | This method registers a function in the tool user's script to be invoked whenever a certain window-type object or objects are found. |
| RemoveObserver | This function "unregisters" a function already passed to AddObserver. |
| RemoveAllObservers | This function removes all registered functions using AddObserver. |
| AddEvent | This function adds one or more event(s) to the list of events to wait for or to be notified with. The function returns a cookie. |
| RemoveEvent | This function removes one or more events from the list of events added. |
| RemoveAllEvents | This function removes all events. |
| AddClick | This function attaches a button click action to a certain event. That is, upon the event, the system will automatically activate the button. |
| RemoveClick | This function removes the button click action. |
| RemoveAllClicks | This function removes all click actions registered. |
| Start | This function is called by the tool user's script so that UIManager initiates the monitoring process. |
| Wait | This function waits for one or all of the events added using AddEvent. |
| Stop | This function stops UIManager from further attempts to monitor UI elements. |
| Reset | This function resets the event handler object internally. |

Functions registered with AddObserver have the following exemplary form:
 function MyCallback(oSender, nEvent, oFound, idObject, nThread, nTime ) where:
 oSender is the EventHandler object sending this event;
 nEvent is the Event received;
 oFound is the Object found, which could be null;
 idObject is the object ID;
 nThread is the Thread ID owning the object; and
 nTime is the Time the event occurred.

EXAMPLE (c)

The following example illustrates the use of the callback function, as well as other features identified in Table 9. In this case, assume that the tool user intends for the script to perform a certain action whenever a specified object appears.
 //---------------------------------------------------------
 // Example of a callback function.
 function OnNotification(oSender, nEvent, oFound, idObject,
nThread, nTime)
 //---------------------------------------------------------
 {
 // This function is called whenever a matching UI Object is found
 }
 //Notify me with all objects appearing from now on
 var oEventHandler = new ActiveXObject("XAble.EventHandler");
 oEventHandler.AddEvent(evtObjectShow);
 oEventHandler.AddObserver(OnNotification);
 oEventHandler.Start ( );
 WScript.Sleep(10000); //This 10 sec lapse is used to pause the script. This can be replaced by other kinds of mechanisms that enable the user to performs the same function. The sleep mechanism is used here for simplification.
 oManager.Stop ( );
 oManager.Reset ( ); //Clears all internal data The Start instruction initiates the monitoring process. The Stop instruction terminates the monitoring processing.

Figure 10:
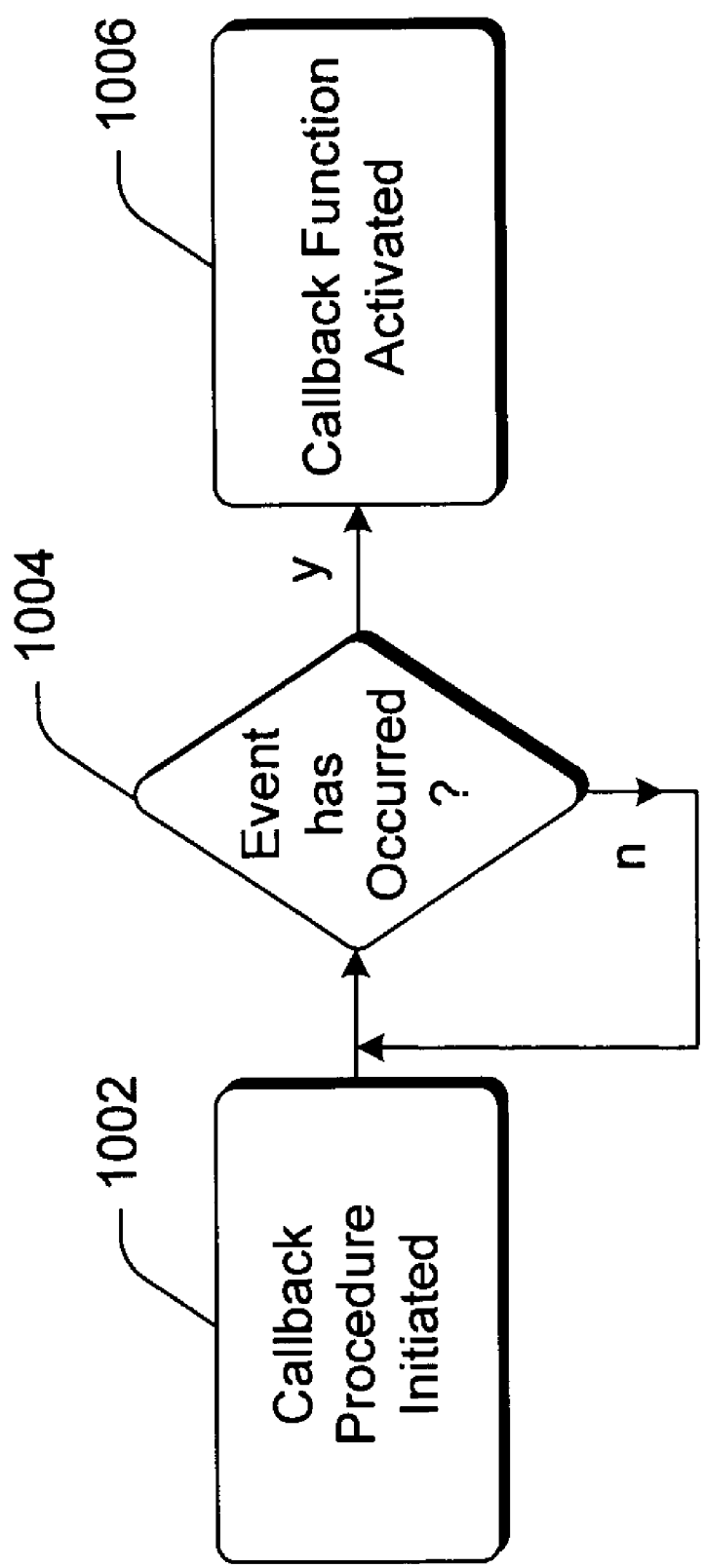
FIG. 10 shows an exemplary callback procedure provided by the manipulation tool shown in FIG. 7.

FIG. 10 summarizes the above discussion by showing high-level aspects of the callback procedure. In step 1002, the callback procedure is initiated. This may entail executing the AddEvent and AddOberserver operations discussed above, followed by the Start operation. In step 1004, the XABLE tool determines whether the event specified in the AddEvent operation has occurred. In step 1006, if the specified event has occurred, the callback function specified in the AddOberserver operation is invoked.

B.4 Keyboard and Mouse Manipulation Functionality

The XABLE tool has support for sending mouse and keyboard events to UI elements. More specifically, the XABLE tool provides so-called "Sendkeys" and "Dokeys" functions, which facilitate the dispatch of keystrokes to the UI. Further, to mimic the mouse behavior, the tool user can use one of the following functions: MouseClick, MouseDblClick, MouseDown, MouseMove and MouseUp.

More specifically, an exemplary syntax for the SendKeys and DoKeys function is as follows:
 SendKeys string[, wait]; and
 DoKeys string[, wait].

The string expression specifies the keystrokes to send. In one exemplary implementation, this expression is required. "Wait" is a Boolean value specifying the wait mode. If False (default), control is returned to the procedure immediately after the keys are sent. If True, keystrokes should be processed before control is returned to the procedure.

The XABLE tool also provides a shorthand technique for instructing the machine to repeat keystrokes N times. For example, to mimic the user pressing the left arrow 6 times, the tool user can use the form: SendKeys "{LEFT+6}." Consider the following short examples:

EXAMPLE (a)

| SendKeys Example | Description |
| --- | --- |
| "M {3}" | This command types "M" 3 times. |
| "+(EC)" | This command causes the shift key to be held down with E and C keys depressed. |
| "^{UP}" | This command actuates the CTRL + Up arrow. |
| "{NUM*}" | This command clicks "*" on Numerical Pad. |

EXAMPLE (b)

The following example presents an illustration of the use of the command Sendkeys. In this example, a calculator application is used to get the result of the arithmetic operation "1+2+8+8+8+8+8=."

```
var g_WshShell = new ActiveXObject("WScript.Shell");
var oProcess = g_WshShell.Exec("Calc"); //Launch
Calculator
var oCalc = g_oUIManager.WaitEx(evtObjectShow,
"Caption = 'Calculator' ", 10000); //Wait until
calculator is visible . . .
if ( !oCalc)
{
WScript.Echo("Failed to wait for calclulator to
show up.");
oProcess.Terminate( );
return −1; //Handle errors
}
oCalc.Window.SendKeys ("1{+}2{+}8{10}= ", true);
//or use DoKeys:
//oCalc.DoKeys ("1{+}2{+}8{10}= ", true);
oCalc.Wait(evtAnyEvent, 500);
var UIRes = oCalc.Window.GetControl(0x193);
//Get control by ID
WScript.Echo("Result =" + UIRes.Caption);
oCalc.SubItem("Close").DoDefaultAction( ); //Close
the window
```

In the above case, the calculator application is launched and then the WaitEx instruction is used to detect the firing of the calculator application. In the event that the calculator is not activated by the timeout period, then error messages are displayed. In the event that the calculator is displayed, then the calculator keys are automatically depressed using the SendKeys instruction. The above example also illustrates the use of the DoKeys instruction to accomplish the same task.

Then the testing script waits for the calculator to calculate the result (with the WaitEx function), and then retrieves the result (using the GetControl function).

Another way to simulate input is through the following mouse click commands:

MouseClick [[Buttons][, Keys] [, x][, y]]; and

MouseClickEx [[Buttons][, Keys] [, x][, y]].

All mouse functions accept a number of parameters that can be specified as numbers or literal strings. The following table summarizes possibly valid parameters:

TABLE 10

Mouse Control Details

| Parameter | Description |
| --- | --- |
| Buttons | This parameter defines mouse buttons to be pressed. This parameter can be a combination of the following values:<br>mbLeft = 1 or L;<br>mbRight = 2 or R; and<br>mbMiddle = 4 or M. |
| Keys | This parameter defines keys pressed during mouse action. This parameter can be a combination of the following values:<br>mkShift = 1 or S;<br>mkCtrl = 2 or C; and<br>mkAlt = 4 or A. |
| X | This parameter defines the horizontal position of the mouse in pixels. This parameter is in client coordinates (by default). The tool user can pass this as a string or as a number. To pass it as a string value, the user can use MouseClickEx; in this case, the tool user can use one of the following forms:<br>"x=val" or "X:val." X is in Client coordinates here.<br>"ScreenX=val" or "ScreenX:val." X is in Screen coordinates here. |
| Y | This parameter defines the vertical position of the mouse in pixels. This parameter is in client coordinates (by default). The tool user can pass this parameter as a string or as a number. To pass it as a string value, the tool user can use MouseClickEx; in this case, the tool user can use one of the following forms:<br>"y=val" or "y:val." Y is in Client coordinates here.<br>"ScreenY=val" or "ScreenY:val". Y is in Screen coordinates here. |

The following examples illustrate how the tool user can utilize the above-described mouse click features.

EXAMPLES (c)

| Example | Description |
| --- | --- |
| MouseClick(1, 0,100, 200);<br>MouseClick(mbLeft, mkShift, 100, 200); | Click Left mouse button at location 100, 200 relative to window-type object. Shift is down. |
| MouseClickEx("R", 2 ,50, 30);<br>MouseClickEx("Right", "c" ,50, 30);<br>MouseClickEx(2, "CTRL" ,50, 30); | Click right mouse button while holding down CTRL at location 50, 30 (using MouseClickEx). |
| MouseClickEx("R+M," "ShiftAlt" ,10, 30); | Click Right + Middle mouse buttons and hold down Shift + Alt at location 10, 30 (using MouseClickEx). |
| MouseClickEx(1, 0 ,"ScreenX=50", "ScreenY=66" ); | Click Left mouse button at location 50, 66 in screen coordinates (using MouseClickEx). |

Figure 11:
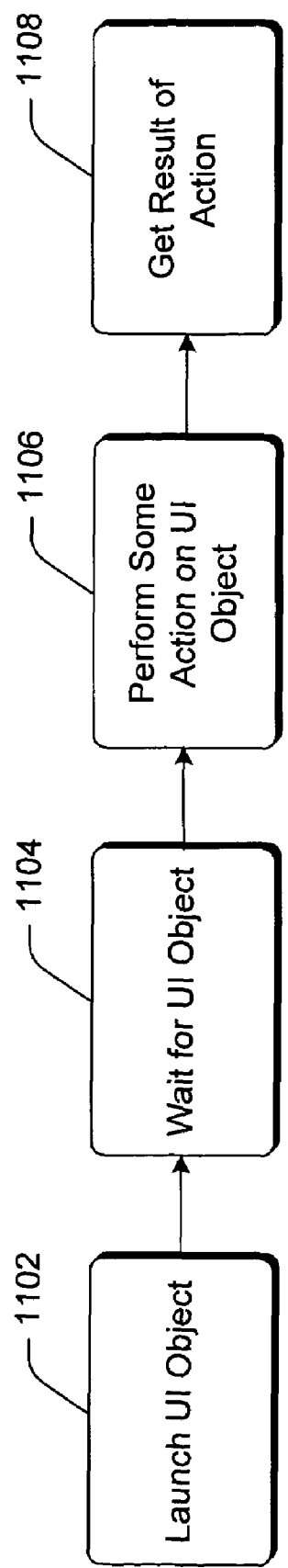
FIG. 11 shows an exemplary procedure for launching and acting on a UI object using the manipulation tool shown in FIG. 7.

FIG. 11 summarizes the above discussion by showing an exemplary high-level procedure for launching a UI object and then performing some action of the UI object. In step 1102, in response to an instruction in the test script, the XABLE tool launches a specified UI object. In step 1104, the XABLE tool waits for the UI object to appear (e.g., using the Wait or WaitEx methods described above). In step 1106, when the UI object is activated, the XABLE tool performs some action of the UI object. For example, this may entail automatically pressing various controls in the UI object using the Dokeys instructions discussion above. In step 1108, the XABLE tool can retrieve information from the UI object that reflects the results of the actions performed in step 1106. In this manner, the XABLE tool can simulate actions that a user might perform on the UI object. This functionality is useful in testing the performance of UI object. For instance, the result obtained in step 1108 can be compared with an expected result to determine whether the UI object is functioning properly. The basic testing paradigm shown in FIG. 11 can be expanded to perform a great many tests for different input assumptions. Alternatively, the basic testing paradigm shown in FIG. 11 can be used to simply automate tasks that the end user routinely performs, and thereby expedite and facilitate the user's interaction with a particular application.

B.5. Controls and Control Types

The XABLE tool handles each control type differently. The XABLE tool detects a control type from its window-type object class. If the window-type object class is not recognized by the XABLE tool, then WindowType value will be WT_UNKNOWN. However, if the tool user knows that this control can be treated as one of the defined types, the tool user can set its WindowType to one of defined values:

WindowType: can be one of WT_UNKNOWN, WT_BUTTON,
WT_COMBOBOX, WT_LISTBOX, WT_MDICLIENT, WT_RichEdit,
WT_RICHEDIT_CLASS, WT_SCROLLBAR, WT_STATIC,
WT_MDICHILD, WT_DIALOG, and WT_HTMLWINDOW.

EXAMPLE (a)

The following example presents a technique that employs a GetControl method. In this example, the calculator application is used to convert 1024 to binary (this time using the VBScript language).

```
Set g_WshShell = CreateObject("WScript.Shell")
Dim oCalc
REM Launch Calculator
Set oProcess = g_WshShell.Exec("Calc")
REM Wait until calculator is visible.
Set oCalc = g_oUIManager.WaitEx(evtObjectShow,
"Caption = 'Calculator'", 10000)
IF oCalc IS NOTHING THEN
WScript.Echo("Failed to wait for calculator to
show up.")
REM Handle errors
oProcess.Terminate
EXIT SUB
END IF
'SendKeys
oCalc.DoKeys "1024", true
'now click on Bin button
oCalc.SubItem("Bin").DoDefaultAction( )
REM Get control by ID
Set UIRes = oCalc.Window.GetControl(&h193)
WScript.Echo("Result = " + UIRes.Caption)
'Close . . .
oCalc.SubItem("Close").DoDefaultAction( ) REM Close
the window.
```

B.6. Menus

The XABLE tool encapsulates Windows® operating system API calls for menus. If a window-type API call fails, then the XABLE tool will report an error. This may happen if the user tries to modify certain attributes of menu items while being modified by Windows® operating system at the same time.

Each window-type object (UIWindow) has a Menu property, which is set to the window-type object's menu (if any). To see if a window has a menu or not, the tool user can check a HasMenu Boolean property. The Menu object simplifies enumeration of menu items. In order to traverse all items on a given menu bar, the tool user can use code similar to the following:

EXAMPLE (a)

Enumeration Example

The following example presents a technique for displaying all menu items for the Calculator window-type object.

```
//Testing Calculator
var oCalc = oManager.Find(XA_USE_TEXT, "Calculator");
if (oCalc)
{
var UIWnd = oCalc.Window
if (UIWnd.HasMenu)
{
   WScript.Echo("Found Menu. Enumerating . . . ");
   for (i = 0; i < UIWnd.Menu.Count; ++i)
   {
      WScript.Echo(I + 1, " – " +
      UIWnd.Menu.Item(i).Caption);
   }
}
}
```

Clicking on an item can also be performed in a straightforward manner with the Menu object. The tool user can use the Click method and pass it the caption of the item to be pressed. The Tool user can include/exclude the ampersand (&).

EXAMPLE (b)

The following example shows a technique for switching the calculator application into scientific mode:

```
//Testing Calculator . . .
var oCalc = oManager.Find(XA_USE_TEXT, "Calculator");
if (oCalc)
{
var UIWnd = oCalc.Window
   if (UIWnd.HasMenu)
   {
      UIWnd.Menu.Click("Scientific");
   }
}
```

B.7. Automatic Insertion of Constants

The XABLE tool provides a library that defines various constants used in manipulating UI objects. For instance, the left button, middle button, and right button of the mouse device can be assigned the constants 1, 2 and 4 in one exemplary implementation. The XABLE tool can be configured to automatically insert these constants from the library whenever called for in the tool user's script. Heretofore, the tool user was required to manually copy these constants into the script.

C. Conclusion

A manipulation tool (e.g., the "XABLE tool") provides a user interface (UI) automation library that allows a tool user to find existing UI objects and then perform a UI action on such UI objects. In one exemplary application, the manipulation tool can be used by script writers to automatically drive the UI of an application under test. A plurality of selectable search strategies are provided for searching for UI objects. Further, an event handling object is provided for monitoring the firing of UI objects.

Although the systems and methods have been described in language specific to structural features and/or procedures, it is to be understood that the invention defined in the appended claims is not necessarily limited to the specific features or procedures described. Rather, the specific features and procedures are disclosed as exemplary forms of implementing the claimed invention.

APPENDIX

XABLE Tool Object Properties and Methods

The following Appendix forms an integral part of the present specification.

TABLE A.1.

Manager Object Properties

| Property | Description |
|---|---|
| ClassName | This property refers to a string used to specify the window-type object's class name. The tool user can use the Spy++ to find out its value. In one implementation, the tool user needs to specify one of the following two flags to use it: SNAP_MATCHCLASS and SNAP_EXACTCLASS. |
| Flags | This property refers to flags used to search for objects and identify them. |
| hWnd | This property refers to the window-type object handle used with XA_EXACT_HWND, XA_HWNT)_CHILDREN and XS_HWND_PARENTS to correlate to a certain window-type object. |
| WindowLevel | This property refers to a window-type object's order in the child parent relationship. Top most window-type objects are at level 0. This method is used with XA_EXACT_WINDOWLEVEL, XA_ABOVE_WINDOWLEVEL, and XA_BELOW_WINDOWLEVEL |
| ModuleName | This property refers to the name of the .EXE module that is being sought. The tool user can set Flags to XA_USE_MODULE. |
| ProcessId | This property refers to Process Id that owns the window-type object(s) that the tool user is concerned with. This property is used with XA_USE_PROCESSID. |
| ThreadId | This property refers to the Thread Id that created the window-type object(s) the tool user is concerned with. This property is used with XA_USE_THREADID. |
| WindowFromPoint(x,y) | This property returns a window-type object that contains the given point, if any. |
| ObjectFromPoint(X, Y) | This property returns the UIObject that contains the given point, if any. |
| Taskbar | This property returns the taskbar object. |
| Foreground | This property returns the active object at the foreground. |
| Desktop | This property returns the desktop object. |
| LastEvent | This property refers to the Event ID of the last event fired. It is used with Wait and WaitEx. |

TABLE A.2

Manager Object Methods

| Method | Description |
|---|---|
| Wait/WaitEx | This method is used to block a tool user's code until a certain UI element is found. |
| FindWindow | This method searches or finds a window-type object by its title only. |
| Find | This method finds one or more objects based on flags the tool user passes to it. |
| FindEx | This method refers to another, more powerful, find method. |
| FromHandle | This method finds an object from hWnd, or hWnd + Control ID. |
| CreateSearchData | This method returns a new SerachData object. |
| SendKeys PressKey KeyDown KeyUp | This method sends Keyboard strokes to object with focus. |
| MouseMove MouseDown MouseUp MouseClick MouseDblClick | This method sends mouse messages and control mouse movements. |
| Snapshot | This method returns all objects in the system. This is very slow and should be used only if needed. |
| FindApp | This method finds the application's main window-type object given a processedID. |

TABLE A.3

UIObject General Properties

| Property | Description |
| --- | --- |
| Item | If True (Default), this property will call AttachThreadInput whenever necessary. |
| Name | This property refers to a form title or control text. |
| Value | This property refers to a window-type object's registered class name. |
| ProcessId | This property is True if Form or Control can accept user input. |
| ThreadId | This property is True if Control, and False if Form. |
| DefaultAction | This property is a Handle to an instance that contains the object. |
| Description | This property refers to flags used to find this window-type object and that are applicable to it. |
| Help | This property refers to a window-type object's window handle. |
| HelpTopic | This property refers to Control ID in case of a child window-type object. |
| Left | This property refers to a Left position of the window-type object (client coordinates, relative to parent, for controls). |
| ModuleName | This property refers to the name of the .EXE that contains this object. |
| Parent | This property refers to the Parent UIWnd object, if any. |
| ProcessId | This property refers to a 32 bit value for Process ID. |
| XScreen | This property refers to screen coordinates for the left edge of the object. |
| YScreen | This property refers to screen coordinates for the top edge of the object. |
| ThreadId | This property refers to a 32 bit value for Thread ID. |
| Top | This property refers to a top position of the window-type object (client coordinates, relative to parent, for controls). |
| Visible | This property is True if object is visible. |
| Width | This property refers to the width of object in pixels. |
| Height | This property refers to the height of object in pixels. |
| KeyboardShortcut | (defined above) |
| Role | (defined above) |
| RoleText | (defined above) |
| State | (defined above) |
| StateText | (defined above) |
| ChildCount | (defined above) |

TABLE A.4

UIWnd General Properties

| Property | Description |
| --- | --- |
| AutoAttach | If True (Default), then this property will call AttachThreadInput whenever necessary. |
| Caption | This property refers to the Form title or control text. |
| ClassName | This property refers to a window-type object's registered class name. |
| Enabled | This property is True if Form or Control can accept user input. |
| FormOrControl | This property is True if Control, False if Form. |
| Height | This property refers to the height of the window-type object in pixels. |
| hInst | This property refers to the handle to the instance that contains the object. |
| HowFound | This property refers to Flags used to find this window-type object and that are applicable to it. |
| hWnd | This property refers to window-type object's handle. |
| ID | This property refers to the Control ID in case of child window-type object. |
| Left | This property refers to the Left position of the window-type object. Client coordinates (relative to parent) for controls. |
| ModuleName | This property refers to the name of .EXE that contains this object. |
| Parent | This property refers to the parent UIWnd object, if any. |
| ProcessId | This property refers to the 32 bit value for Process ID. |
| XScreen | This property refers to the screen coordinates for the left edge of the object. |
| YScreen | This property refers to the screen coordinates for the top edge of the object. |
| ThreadId | This property refers to the 32 bit value for Thread ID. |
| Top | This property refers to the top position of the window-type object (client coordinates, relative to parent, for controls). |
| Visible | This property is true if the object is visible. |
| Width | This property refers to the width of window-type object in pixels. |
| WindowStyle | This property refers to the 32 bit value for window-type object Style. |
| WindowStyleEx | This property refers to the 32 bit value for an extended window-type object style. |
| WindowType | This property refers to the type of the object. This value can be one of the following: WT_UNKNOWN (unrecognized type) WT_BUTTON; WT_COMBOBOX; WT_LISTBOX; WT_MDICLIENT; WT_RichEdit; WT_RICHEDIT_CLASS; WT_SCROLLBAR; WT_STATIC; WT_MDICHILD; WT_DIALOG; and WT_HTMLWINDOW. |

A.5. UIWnd Form Properties

| Property | Description |
| --- | --- |
| ActiveControl | This property returns the control that has the focus. When a form is referenced, ActiveControl specifies the control that would have the focus if the referenced form were active. Read-only at run time. |
| Children | This property returns a UIWnds object if the form has one or more child window-type objects. |
| ChildrenFromPoint (x,y) | This property returns a UIWnds object if the form has one or more child window-type objects containing the given point. |
| HasMenu | This property is True if the form has a menu, and it is False if not. |
| HasSysMenu | This property is True if the form has a system menu. |
| HelpButton | This property is True if the form has a help button. |
| MaxButton | This property is True if the form has a maximize button. |
| MDIChild | This property is True if the form is an MDI child. |
| Menu | This property returns the UIMenu object that represents the form's menu. |
| MinButton | This property is True if the form has a minimize button. |
| SysMenu | This property returns the UIMenu object that represents the form's system menu. |
| TopMost | This property is either true True/False. According to its value, it sets the form as the top most or just reads the value. |
| TopWindow | This property returns a UIWnd object representing the top window-type object if any. |
| WindowState | This property returns or sets a value indicating the visual state of a form window-type object, where: 0 means Normal; 1 Means Minimized; and 2 Means Maximized. |

A.6. UIWnd TextBox Properties

| Property | Description |
| --- | --- |
| CanUndo | This property is True if the last edit operation can be undone by a call to the Undo member function, and False if it cannot be undone. |
| Line(index) | This property returns the requested line inside a multi line edit. |
| LineCount | This property returns a number of lines in a multi line edit. |
| MaxLength | This property sets a value indicating whether there is a maximum number of characters that can be entered in the TextBox control and, if so, specifies the maximum number of characters that can be entered. Zero means no limit. |
| MultiLine | This property returns a value indicating whether a TextBox control can accept and display multiple lines of text. |
| PasswordChar | This property returns or sets a value indicating whether the characters typed by a user or placeholder characters are displayed in a TextBox control, and returns or sets the character used as a placeholder. |
| ReadOnly | This property is True if tool user cannot change the text inside the TextBox. |
| SelectedText | This property returns the selected text if any, inside the TextBox. |
| Text | This property returns the text of the TextBox. |

A.7. UIWnd ListBox and ComboBox Properties

| Property | Description |
| --- | --- |
| ItemData | This property returns or sets a specific number for each item in a ComboBox or ListBox control. |
| List | This property returns or sets the items contained in a control's list portion. The list is a string array in which each element is a list item. |
| ListCount | This property returns the number of items in the list portion of a control. |
| ListIndex | This property returns or sets the index of the currently selected item in the control. |
| MultiSelect | This property returns a value indicating whether a user can make multiple selections in a ListBox control and how the multiple selections can be made. |
| SelCount | This property returns the number of selected items in a ListBox control with MultiSelect. |
| Selected (index) | This property returns or sets the selection status of an item in a ListBox controls. This property is an array of Boolean values with the same number of items as the List property. |

A.8. UIWnd ScrollBar Properties

| Property | Description |
| --- | --- |
| Max | This property sets or returns the maximum value of the scroll range for the UpDown control. |
| Min | This property sets or returns the minimum value of the scroll range for the UpDown control. |
| Value | This property sets or returns the current position of the scroll value. |

A.9. UIWnd HTML Properties

| Property | Description |
| --- | --- |
| Document | This property returns the HTML document object inside an HTML window-type object. |

A.10. UIWnd General Methods

| Method | Description |
| --- | --- |
| AttachInput | This method attaches the input processing mechanism of tool user's script to that of window-type object. |
| Click | This method clicks on the window-type object. |
| DblClick | This method double clicks on the window-type object. |
| MouseClick | This method uses MouseClick on the window-type object. |
| MouseDown | This method uses MouseDown on the window-type object. |
| MouseMove | This method uses MouseMove on the window-type object. |
| MouseUp | This method uses MouseUp on the window-type object. |
| Move | This method moves the window-type object from its location. |
| Quit | This method quits the application that owns the window-type object. |
| Resize | This method resizes the window-type object. |
| SendKeys | This method sends one or more keystrokes to window-type object as if typed at the keyboard. |
| SetFocus | This method moves the focus to the specified window-type object or control. |
| Terminate | This method terminates the application. |

A.11. UIWnd Form Methods

| Method | Description |
| --- | --- |
| Activate | This method activates a window-type object, and brings it into the foreground. |
| CancelMode | This method cancels any opened menus. |
| ClickButton | This method clicks on a button by name or id. |
| Close | This method closes the form, if possible. |
| Destroy | This method destroys the form, if possible. |
| GetControl | This method returns a UIWnd for a control given its name or Id. |
| GetText | This method returns the text in the form and/or any of the requested children. |
| Hide | This method hides the form. |
| Refresh | This method invalidates and repaints the form. |
| Show | This method sets the Form's Visible property to True. |

A.12. UIWnd TextBox Methods

| Method | Description |
| --- | --- |
| ClearUndo | This method clears the Undo buffer. A subsequent call to Undo will not change the text. |
| ScrollCaret | This method scrolls the caret into the view. |
| SelectText (start, length) | This method selects parts or all of text in the TextBox. |
| Undo | This method Undo's the last TextBox operation. |

A.13. UIWnd ListBox and ComboBox Methods

| Method | Description |
| --- | --- |
| AddItem item, index | This method adds an item to a ListBox or ComboBox control. If the tool user supplies a valid value for index, item is placed at that position within the object. If index is omitted, item is added at the end of the list. |
| Clear | This method removes all items from the list. |
| RemoveItem index | This method removes an item from a ListBox or ComboBox. |

A.14. UIWnds Properties

| Property | Description |
| --- | --- |
| Count | This property refers to the number of UIWnd Items contained in this collection object. |
| Item (index) | This property returns UIWnd object given its position. |

A.15. UIMenu Properties

| Property | Description |
| --- | --- |
| Count | This property refers to the number of UIMenu Items contained in this collection object. |
| hMenu | This property refers to the window-type object's handle to the menu. |
| Usekeyboard | For this property, if True, then keystrokes will be sent to the menu whenever it is accessed, just as if a user is doing so. |
| Click (Caption) | This property clicks on a menu item. Caption refers to the item string with or without ampersand (&). |
| EnterLoop | This property sends WM_ENTERLOOP message to the menu. |
| ExitLoop | This property sends WM_EXITLOOP message to the menu. |
| Item (Index) | This property returns UIMenu object given its position. |
| Reload | This property traverses the menu reading all items in it. |

A.16. UIMenuItem Properties

| Property | Description |
| --- | --- |
| Caption | This property refers to a string representing Menu Item caption. |
| Checked | This property is True if Item has a check mark next to it. |
| Count | This property refers to the number of menu items, and is Valid only if item is a popup. |
| Item (Index) | This property returns UIMenu object given its position. |
| Enabled | This property is True if menu item is enabled, and False if disabled and grayed. |
| Hmenu | This property refers to the window-type object's handle to the menu. |
| ID | This property refers to the menu Item ID. |
| IsMenu | This property is True if item is a popup. |
| Type | This property refers to the type of the menu item. |
| Click | This Property clicks on the item, if possible. |
| Hilite | This property Hilites the item. |

What is claimed is:

1. An apparatus comprising a computing device having one or more processors and computer-readable storage media for interacting with a target software product having user interface functionality, comprising:

script execution logic configured to execute a script that involves interaction with the user interface functionality of the target software product; and manipulation tool logic that provides functionality for use by the script application logic in interfacing with the target software product, wherein the manipulation tool logic includes search logic configured to search for a user interface object using a plurality of different selectable search strategies and comprises event handling logic configured to monitor a firing of the user interface object and execute a callback function upon the occurrence of a specified event caused by the firing of the user interface object, wherein the event handling logic is further configured to block the execution of the script execution logic until a second specified event has occurred within a specified timeout period, wherein error processing is performed if the second specified event does not occur within the specified timeout period, the callback function executing a prescribed function upon the occurrence of the specified event, wherein one of the search strategies is a flag-based attribute search strategy that involves comparing a specified property value and qualifying flag information with information associated with the user interface object, wherein the flag information is configured to provide a filtering function in a search by restricting results of the search to a certain subset of results based on the flag information.

2. An apparatus according to claim 1, wherein the manipulation tool logic is configured to interface with the target software product using a window-type interface and an accessibility interface.

3. An apparatus according to claim 1, wherein one of the search strategies is an SQL-type query string search strategy that involves comparing a specified string with information associated with the user interface object.

4. An apparatus according to claim 1, wherein the second specified event pertains to a firing of a specified user interface object or the user interface object.

5. An apparatus comprising a computing device having one or more processors and computer-readable storage media for interacting with a target software product having user interface functionality, comprising:

script execution logic configured to execute a script that involves interaction with the user interface functionality of the target software product; and manipulation tool logic that provides functionality for use by the script application logic in interacting with the target software product, wherein the manipulation tool logic includes search logic configured to perform a flag-based attribute search strategy that involves comparing a specified attribute value and qualifying flag information with information associated with a second user interface object or the user interface object, wherein the flag information is configured to provide a filtering function in a search, wherein the manipulation tool logic further comprises event handling logic configured to block the execution of the script execution logic until a specified event has occurred within a specified timeout period, wherein error processing is performed if the specified event does not occur within the specified timeout period, and wherein the event handling logic is further configured to monitor a firing of a user interface object and execute a callback function upon the occurrence of the specified event or a second specified event caused by the firing of the user interface object, the callback function executing a prescribed function upon the occurrence of the specified event or the second specified event.

6. An apparatus according to claim 5, wherein the specified event pertains to a firing of a second user interface object.

7. An apparatus according to claim 5, wherein the manipulation tool logic is configured to interface with the target software product using a window-type interface and an accessibility interface.

8. An apparatus according to claim 5, wherein the manipulation tool logic includes search logic configured to perform an SQL-type query string search strategy that involves comparing a specified string with information associated with a second user interface object or the user interface object.

9. A method for interacting with a target software product having user interface functionality, comprising:

executing a script that involves interaction with the user interface functionality of the target software product; and interfacing with a manipulation tool library to carry out at least two functions specified in the script, wherein the at least two functions include:

searching for a user interface object using a selectable one of a plurality of different search strategies provided by the manipulation tool library, wherein one of the selectable search strategies is a flag-based attribute search strategy that involves comparing a specified attribute value and qualifying flag information with information associated with the user interface object, wherein the flag information is configured to provide a filtering function in a search; and executing a callback function upon the occurrence of a specified event within a specified timeout period caused by a firing of the user interface object, the callback function executing a prescribed function upon the occurrence of the specified event and blocking the execution of the script until the specified event has occurred within the specified timeout period and generating an error message if the specified event does not occur within the specified timeout period.

10. A method according to claim 9, wherein the act of interfacing with a manipulation tool library comprises interfacing with the target software product using a window-type interface and an accessibility interface.

11. A method according to claim 9, wherein one of the selectable search strategies is an SQL-type query string search strategy that involves comparing a specified string with information associated with the user interface object.

12. A method for interacting with a target software product having user interface functionality, comprising:

executing a script that involves interaction with the user interface functionality of the target software product; and interfacing with a manipulation tool library to carry out at least two functions specified in the script, wherein the at least two functions include:

event handling for blocking the execution of the script until a specified event has occurred within a specified timeout period and generating an error message if the specified event does not occur within the specified timeout period; and executing a callback function upon the occurrence of a second specified event caused by a firing of a user interface object, the callback function executing a prescribed function upon the occurrence of the second specified event, wherein another function of the manipulation tool library comprises searching using a flag-based attribute search strategy that involves comparing a specified attribute value and qualifying flag information with information associated with the user interface object, wherein the flag information is configured to provide a filtering function in a search.

13. A method according to claim 12, wherein the specified event pertains to a firing of a specified user interface object.

14. A method according to claim 12, wherein the act of interfacing comprises interfacing with the target software product using a window-type interface and an accessibility interface.

15. A method according to claim 12, wherein another function of the manipulation tool library comprises searching using an SQL-type query string search strategy that involves comparing a specified string with information associated with the user interface object.

\* \* \* \* \*